(12) United States Patent
Roh

(10) Patent No.: US 8,938,018 B2
(45) Date of Patent: Jan. 20, 2015

(54) METHOD AND SYSTEM FOR REDUCING INTER CARRIER INTERFERENCE FOR OFDM

(75) Inventor: Dongwook Roh, San Diego, CA (US)

(73) Assignee: LG Electronics Inc., Seoul (KR)

( * ) Notice: Subject to any disclaimer, the term of this patent is extended or adjusted under 35 U.S.C. 154(b) by 990 days.

(21) Appl. No.: 13/014,989

(22) Filed: Jan. 27, 2011

(65) Prior Publication Data

US 2011/0243266 A1    Oct. 6, 2011

Related U.S. Application Data

(60) Provisional application No. 61/320,988, filed on Apr. 5, 2010, provisional application No. 61/327,710, filed on Apr. 25, 2010.

(51) Int. Cl.
*H04L 5/12* (2006.01)
*H04L 27/34* (2006.01)

(52) U.S. Cl.
CPC ................................ *H04L 27/3472* (2013.01)
USPC ...................................................... 375/261

(58) Field of Classification Search
CPC .................. H04L 27/34–27/38; H04L 5/0007; H04L 5/0204; H04L 29/06; H04B 10/1143; H04B 17/0007; H04B 7/084; H04Q 11/0428; H04Q 3/26; H03F 1/3247
USPC ................. 375/260, 261; 370/206, 420, 465; 455/276.1
See application file for complete search history.

(56) References Cited

U.S. PATENT DOCUMENTS

| 5,581,578 | A  * | 12/1996 | De Bot ............................ 375/261 |
| 7,813,433 | B2 * | 10/2010 | Moffatt ........................... 375/260 |
| 2002/0141440 | A1* | 10/2002 | Stanley et al. ................. 370/465 |
| 2003/0223353 | A1 | 12/2003 | Wallace |
| 2003/0224750 | A1* | 12/2003 | Sampath ..................... 455/276.1 |
| 2006/0036924 | A1 | 2/2006 | Ghosh |
| 2008/0112498 | A1 | 5/2008 | van Nee et al. |

FOREIGN PATENT DOCUMENTS

JP          2005086781          3/2005

* cited by examiner

Primary Examiner — Daniel Washburn
Assistant Examiner — Fitwi Hailegiorgis
(74) Attorney, Agent, or Firm — Lee, Hong, Degerman, Kang & Waimey

(57) ABSTRACT

According to one embodiment, a method of encoding a plurality of orthogonal frequency division multiplexing (OFDM) signals is disclosed. The method includes: modulating the plurality of OFDM signals according to a modulation scheme, wherein the modulated OFDM signals are mapped to a first axis and a second axis perpendicular to the first axis, and correspond to a first constellation having a plurality of points symmetric with respect to the first axis and the second axis; and differentially encoding the plurality of OFDM signals according to a second constellation plurality of points defined by shifting a position of one of the first constellation plurality of points toward an origin located at an intersection of the first axis and the second axis.

13 Claims, 22 Drawing Sheets

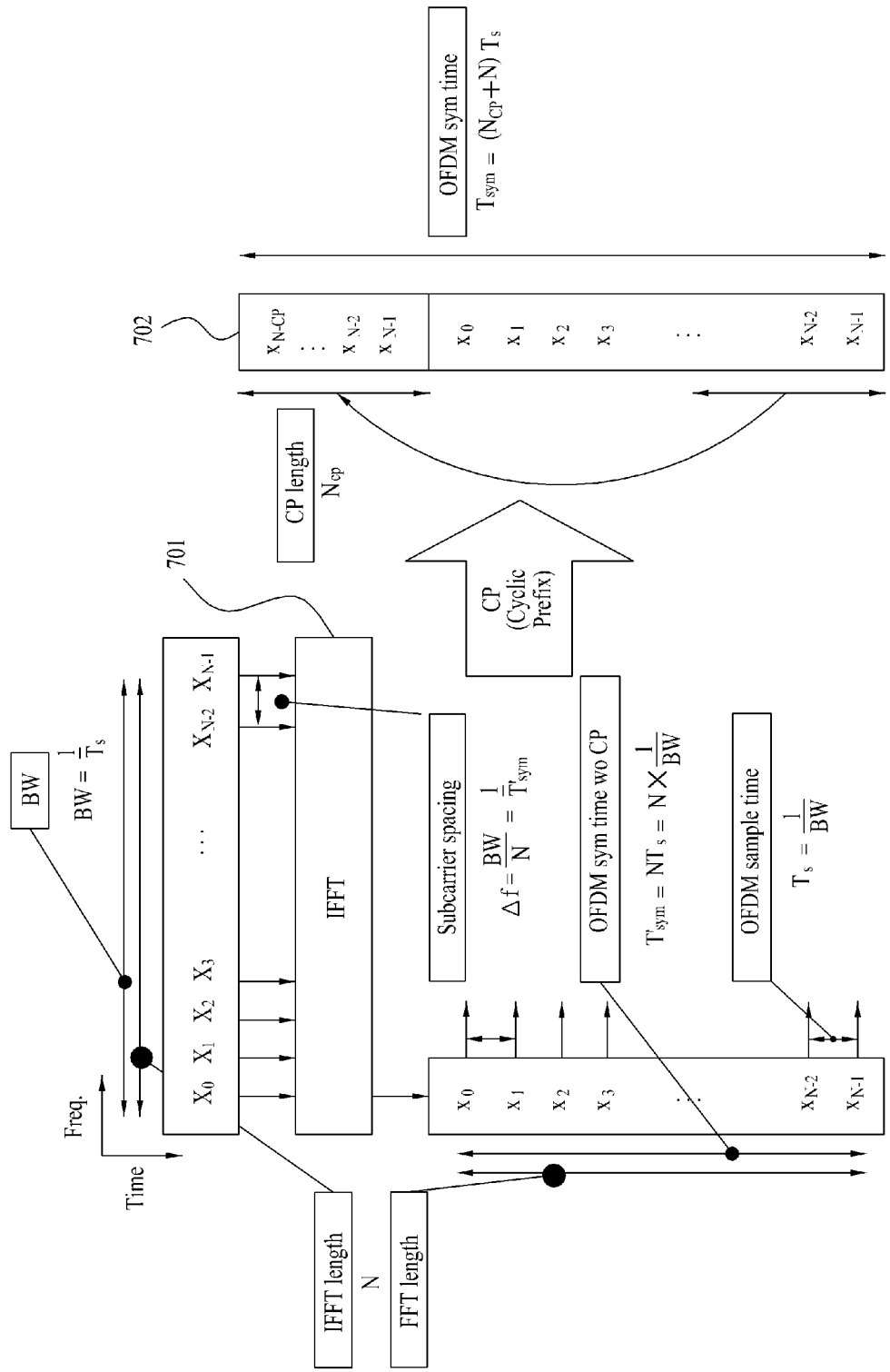

or

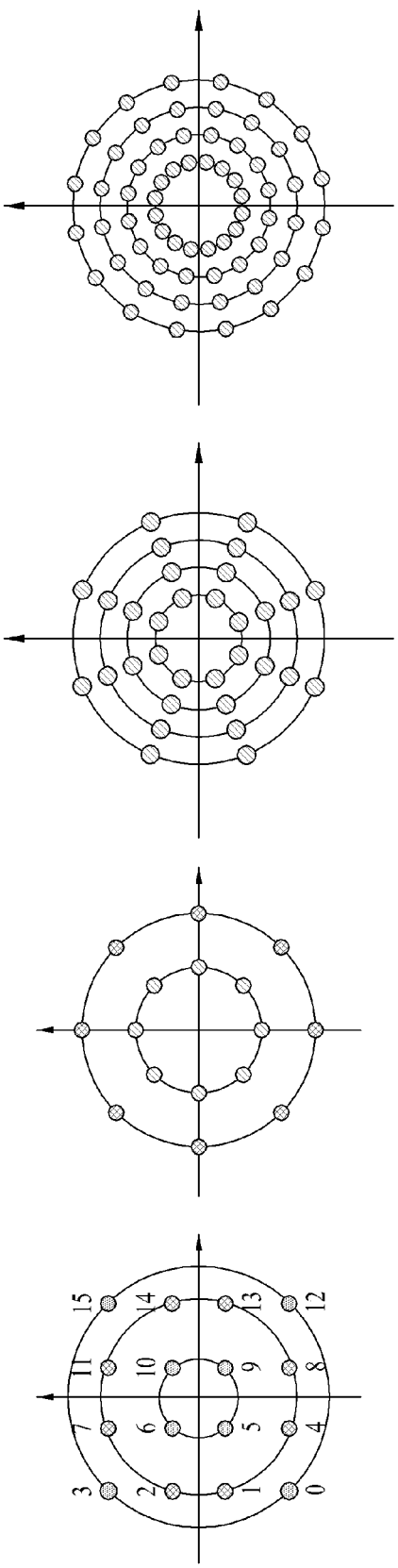

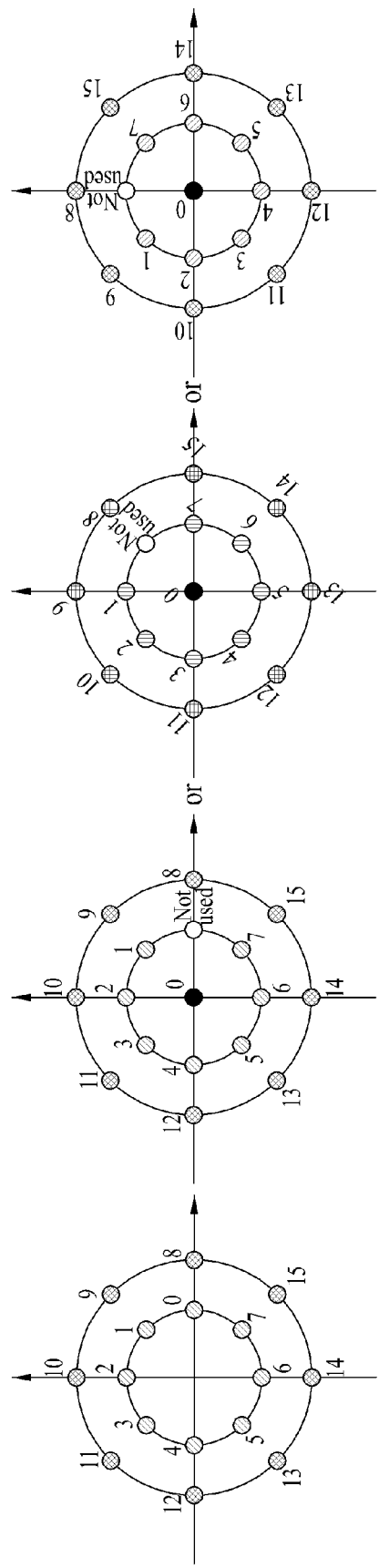

METHOD AND SYSTEM FOR REDUCING INTER CARRIER INTERFERENCE FOR OFDM

Pursuant to 35 U.S.C. §119(e), this application claims the benefit of U.S. Provisional Application Ser. No. 61/320,988, filed on Apr. 5, 2010, and U.S. Provisional Application Ser. No. 61/327,710, filed on Apr. 25, 2010, the contents of all of which are incorporated by reference herein in their entirety.

BACKGROUND

1. Field

Embodiments of the present invention relate to reducing inter carrier interference (ICI). Particular embodiments relate to reducing ICI in orthogonal frequency division multiplexing (OFDM).

2. Discussion of the Related Art

Contemporary communication systems are commonly operated in mobile environments in which rapid movements of both transmitter and receiver ends may occur. During communication, this mobility aspect inevitably generates Doppler shifts along frequencies, which create unwanted multipaths in the time domain. Effects of multipath cause the channel response to become time variant, which destroys the orthogonality between subcarriers. If the orthogonality between subcarriers is not maintained, then the subcarriers interfere with each other, generating what is referred to as inter carrier interference (ICI). The ICI can significantly degrade the performance of systems using, for example, orthogonal frequency division multiplexing (OFDM).

SUMMARY

Techniques, apparatuses and systems described herein can be used in various wireless access technologies such as code division multiple access (CDMA), frequency division multiple access (FDMA), time division multiple access (TDMA), orthogonal frequency division multiple access (OFDMA), single carrier frequency division multiple access (SC-FDMA), etc. CDMA may be implemented with a radio technology such as Universal Terrestrial Radio Access (UTRA) or CDMA2000. TDMA may be implemented with a radio technology such as Global System for Mobile communications (GSM), General Packet Radio Service (GPRS), and/or Enhanced Data Rates for GSM Evolution (EDGE). OFDMA may be implemented with a radio technology such as Institute of Electrical and Electronics Engineers (IEEE) 802.11 (Wi-Fi), IEEE 802.16 (WiMAX), IEEE 802-20, evolved-UTRA (E-UTRA), etc. UTRA is a part of a universal mobile telecommunication system (UMTS).

3rd generation partnership project (3GPP) long term evolution (LTE) is a part of an evolved-UMTS (E-UMTS) using the E-UTRA. 3GPP LTE employs OFDMA in downlink and employs SC-FDMA in uplink. LTE-advance (LTE-A) is an evolved version of 3GPP LTE. For purposes of description, particular embodiments are described herein with reference to 3GPP LTE/LTE-A. However, it is understood that embodiments of the present invention may be implemented in other contexts.

According to one embodiment, a method of encoding a plurality of orthogonal frequency division multiplexing (OFDM) signals is disclosed. The method includes: modulating the plurality of OFDM signals according to a modulation scheme, wherein the modulated OFDM signals are mapped to a first axis and a second axis perpendicular to the first axis, and correspond to a first constellation having a plurality of points symmetric with respect to the first axis and the second axis; and differentially encoding the plurality of OFDM signals according to a second constellation plurality of points defined by shifting a position of one of the first constellation plurality of points toward an origin located at an intersection of the first axis and the second axis.

According to another embodiment, a method of encoding a plurality of orthogonal frequency division multiplexed (OFDM) signals is disclosed. The method includes: modulating the plurality of OFDM signals according to a modulation scheme, wherein the modulated plurality of OFDM signals are mapped to a first axis and a second axis perpendicular to the first axis, and correspond to a first constellation having a plurality of points symmetric with respect to the first axis and the second axis; and differentially encoding the plurality of OFDM signals according to a second constellation plurality of points in which one of the first constellation plurality of points is positioned at a transmission-off state.

BRIEF DESCRIPTION OF THE DRAWINGS

The above and other aspects and features of the present disclosure will become more apparent upon consideration of the following description of embodiments, taken in conjunction with the accompanying drawing figures:

FIG. 7 is a block diagram of a transmitter employing OFDM.

FIGS. 11A and 11B illustrate MPSK constellations.

FIGS. 20A, 20B, 20C and 20D illustrate examples of Star QAM constellations.

FIGS. 21A, 21B, 21C and 21D illustrate an application of differential encoding to a 16 Star-QAM modulation scheme according to one embodiment.

DETAILED DESCRIPTION

Figure 1:
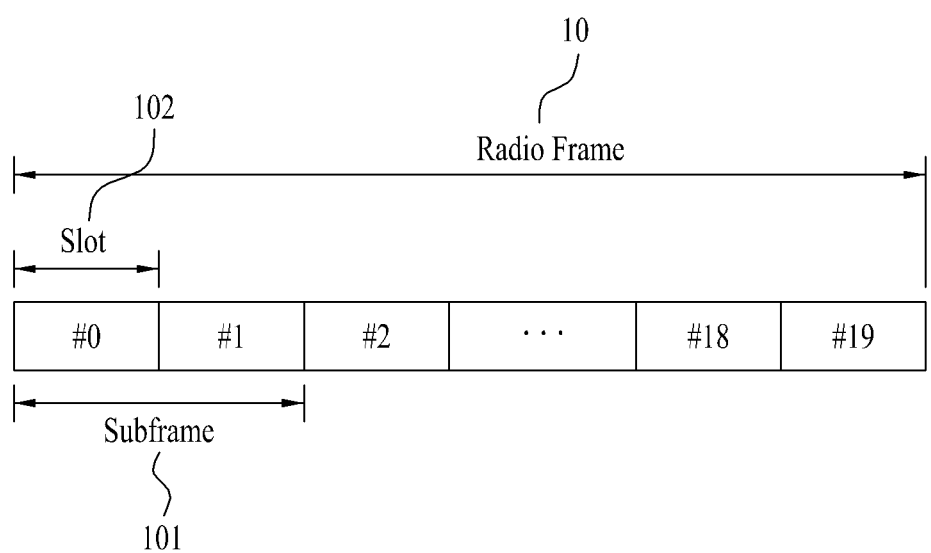
FIG. 1 illustrates a structure of a radio frame.

With reference to FIG. 1, a radio frame 10 according to one embodiment includes 10 subframes. A subframe 101 includes two slots 102 with respect to the time domain. A time for transmitting one subframe 101 is referred to as a transmission time interval (TTI). For example, one subframe 101 may have a length of 1 millisecond (msec), and one slot 102 may have a length of 0.5 msec. One slot 102 includes a plurality of orthogonal frequency division multiplexing (OFDM) symbols with respect to the time domain (see, e.g., downlink slot 202 of FIG. 2). Since 3GPP LTE uses the orthogonal frequency division multiple access (OFDMA) in the downlink, the OFDM symbol is for representing one symbol period. The OFDM symbol may also be referred to as a single carrier frequency division multiple access (SC-FDMA) symbol or a symbol period.

Figure 2:
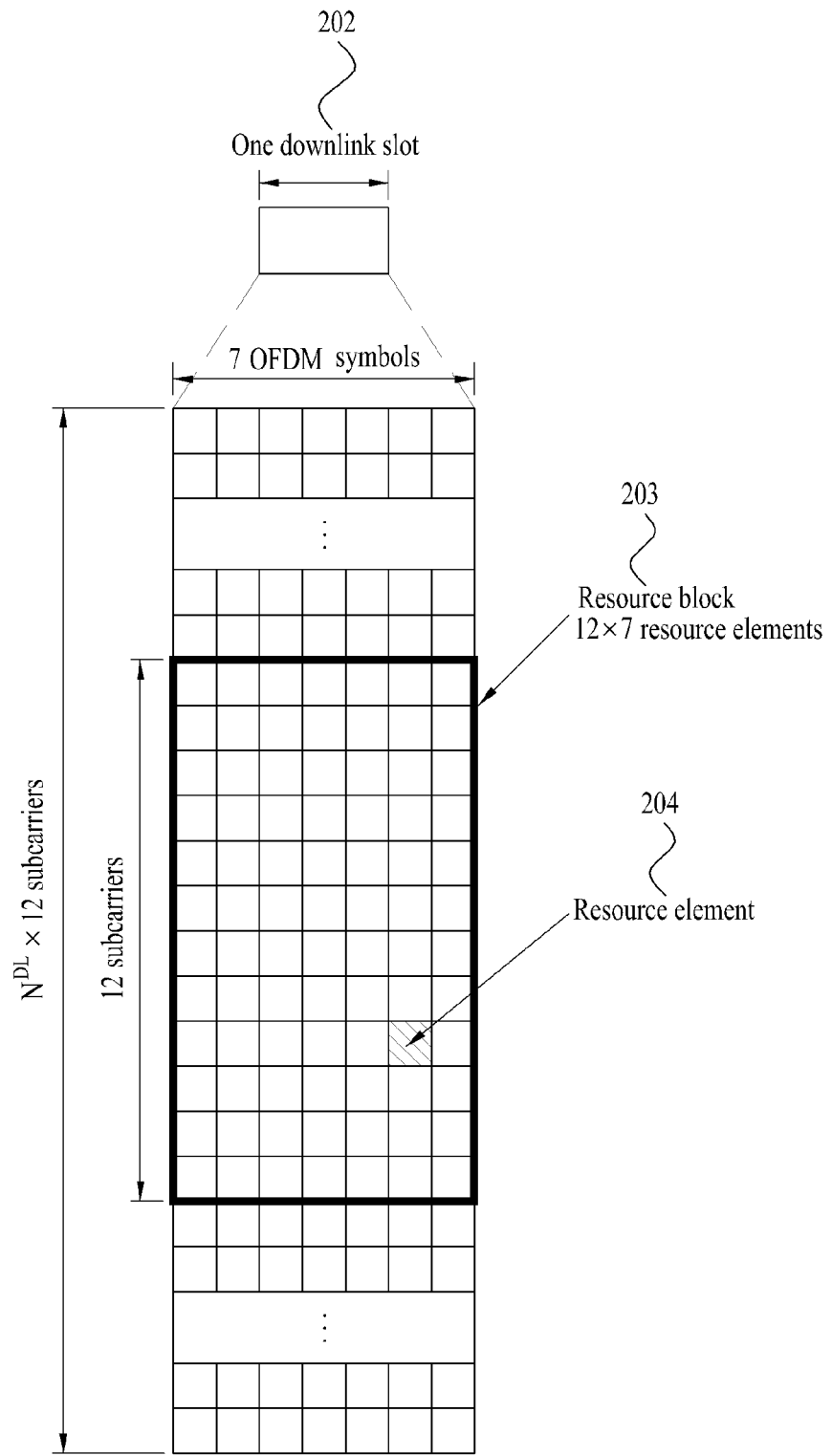
FIG. 2 illustrates a resource grid corresponding to one downlink slot.

A resource block (RB) is a resource allocation unit, and includes a plurality of contiguous subcarriers in one slot (see, e.g., resource block 203 of FIG. 2). As previously noted, FIG. 1 illustrates a radio frame according to one embodiment. It is understood that, according to other embodiments, the number of subframes included in the radio frame, the number of slots included in the subframe, and/or the number of OFDM symbols included in the slot may vary.

With reference to FIG. 2, a downlink slot 202 is illustrated according to one embodiment. The downlink slot 202 includes a plurality of OFDM symbols with respect to the time domain. The downlink slot 202 includes 7 OFDM symbols, and the RB 203 includes 12 subcarriers with respect to the frequency domain. It is understood that, according to other embodiments, the size and/or structure of the downlink slot 202 and the RB 203 may vary. Each element on the resource grid is referred to as a resource element (e.g., resource element 204). The RB 203 includes 12×7 resource elements 204. The number of RBs ($N^{DL}$) included in the downlink slot 202 depends on a downlink transmit bandwidth. The structure of an uplink slot may be the same as that of the downlink slot 202.

Figure 3:
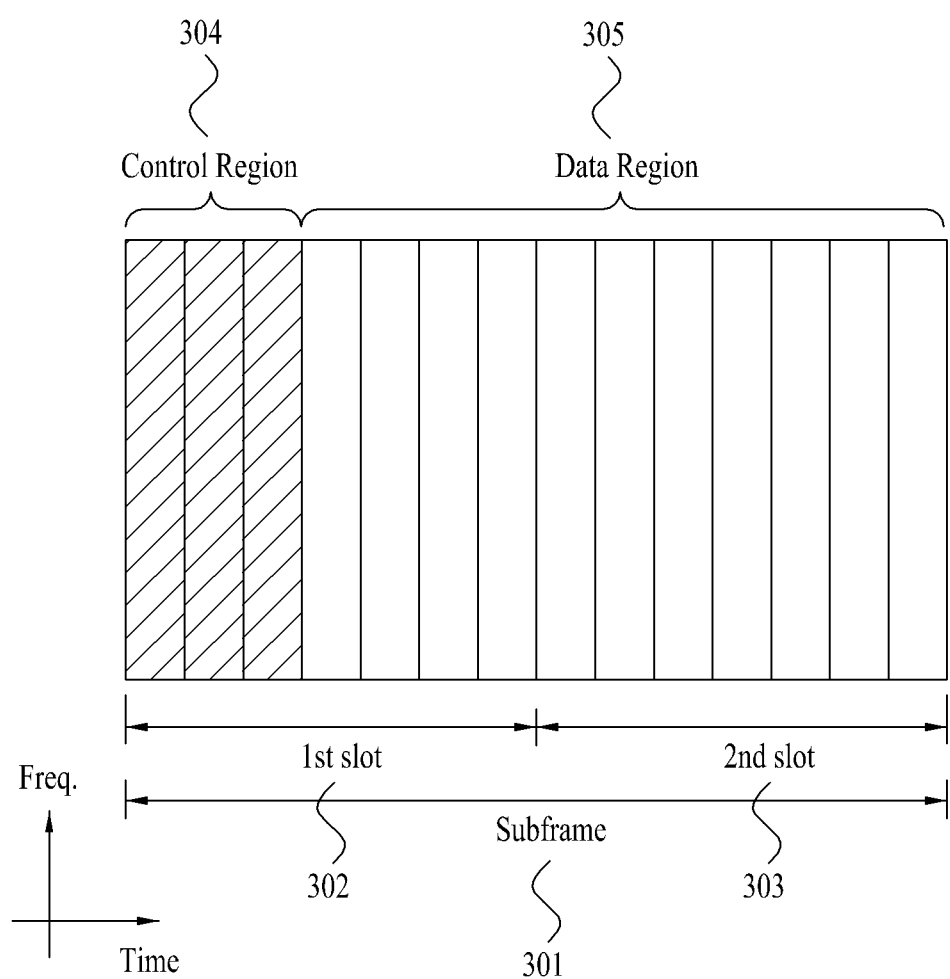
FIG. 3 illustrates a structure of a downlink subframe.

With reference to FIG. 3, a downlink subframe 301 is illustrated according to one embodiment. The subframe 301 includes a first slot 302 and a second slot 303. With respect to the first slot 302, the first three OFDM symbols correspond to a control region 304 to be assigned to a control channel (i.e., a downlink control channel). According to one embodiment, a maximum of three OFDM symbols located in a front portion of the first slot 302 within the subframe 301 corresponds to a control region to be assigned to a control channel. The remaining OFDM symbols correspond to a data region 305 to be assigned to a physical downlink shared channel (PDSCH).

Examples of downlink control channels used in the 3GPP LTE include a physical control format indicator channel (PCFICH), a physical downlink control channel (PDCCH), a physical hybrid automatic repeat request (ARQ) indicator channel (PHICH), etc. The PCFICH is transmitted at a first OFDM symbol of a subframe (e.g., subframe 301 of FIG. 3) and carries information regarding the number of OFDM symbols used for transmission of control channels within the subframe. The PHICH is a response to an uplink transmission and carries a hybrid automatic repeat request (HARQ) acknowledgment (ACK)/non-acknowledgment (NACK) signal. Control information transmitted through the PDCCH is referred to as downlink control information (DCI). The DCI includes uplink or downlink scheduling information or includes an uplink transmit (Tx) power control command for arbitrary user equipment (UE) groups.

The PDCCH may carry a transport format and a resource allocation of a downlink shared channel (DL-SCH), resource allocation information of an uplink shared channel (UL-SCH), paging information on a paging channel (PCH), system information on the DL-SCH, a resource allocation of an upper-layer control message such as a random access response transmitted on the PDSCH, a set of Tx power control commands on individual UEs within an arbitrary UE group, a Tx power control command, activation of a voice over IP (VoIP), etc. A plurality of PDCCHs can be transmitted within a control region (e.g., control region 304 of FIG. 3). The UE can monitor the plurality of PDCCHs.

The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups. A format of the PDCCH and the number of bits of the available PDCCH are determined according to a correlation between the number of CCEs and the coding rate provided by the CCEs. The base station (BS) determines a PDCCH format according to a DCI to be transmitted to the UE, and attaches a cyclic redundancy check (CRC) to the control information.

The CRC is masked with a unique identifier (referred to as a radio network temporary identifier (RNTI)) according to an owner or usage of the PDCCH. If the PDCCH is for a specific UE, a unique identifier (e.g., a cell-RNTI (C-RNTI)) of the UE may be masked to the CRC. Alternatively, if the PDCCH is for a paging message, a paging indicator identifier (e.g., a paging-RNTI (P-RNTI)) may be masked to the CRC. If the PDCCH is for system information (e.g., a system information block (SIB), as will be described in more detail below), a system information identifier and a system information RNTI (SI-RNTI) may be masked to the CRC. To indicate a random access response that is a response for transmission of a random access preamble of the UE, a random access-RNTI (RA-RNTI) may be masked to the CRC.

Figure 4:
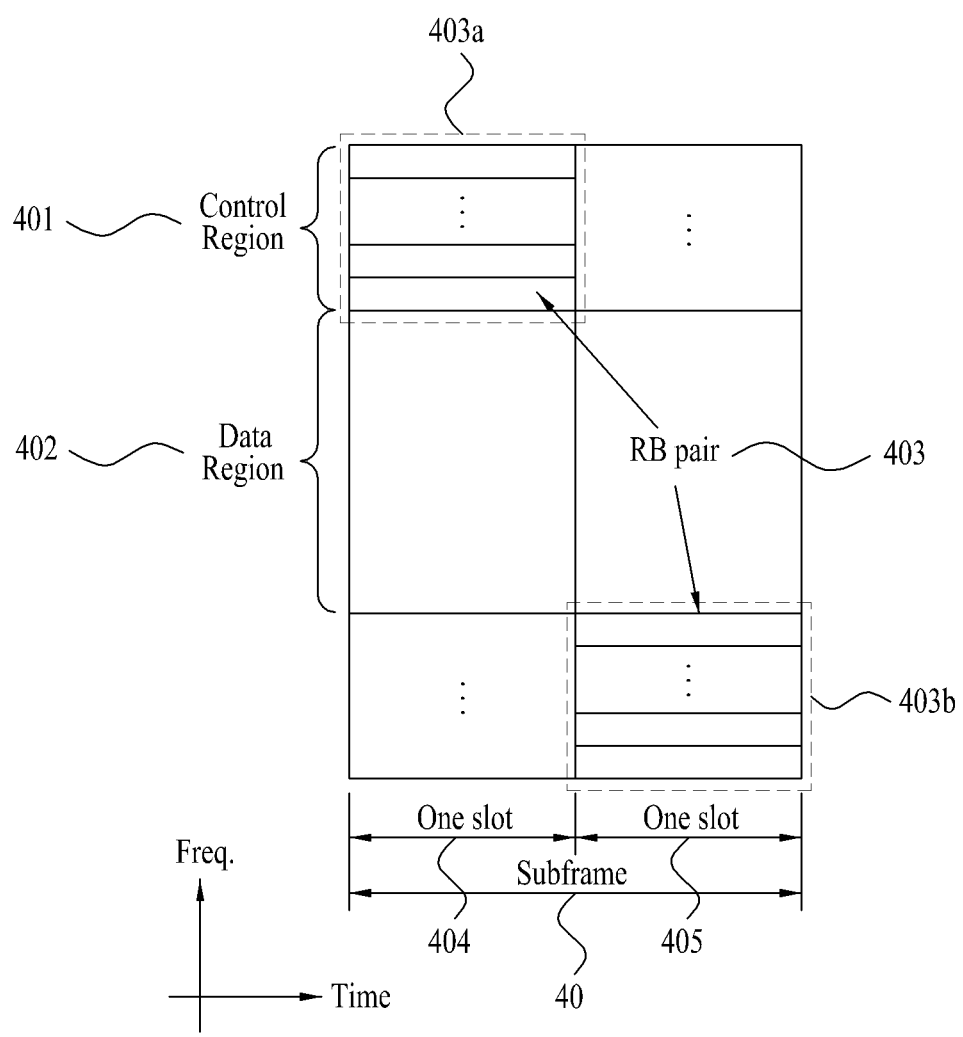
FIG. 4 illustrates a structure of an uplink subframe.

With reference to FIG. 4, an uplink subframe 40 can be divided with respect to a frequency domain into a control region 401 and a data region 402. The control region 401 is allocated to a physical uplink control channel (PUCCH) for carrying uplink control information. The data region 402 is allocated to a physical uplink shared channel (PUSCH) for carrying user data. To maintain a single carrier property, one UE (i.e., a given UE) does not simultaneously transmit the PUCCH and the PUSCH. The PUCCH for a given UE is allocated an RB pair 403 (i.e., RBs 403a and 403b) in the subframe 40. The RBs 403a and 403b belonging to the RB pair 403 occupy different subcarriers in their respective slots (slots 404, 405). In other words, the RB pair allocated to the PUCCH is frequency-hopped in a slot boundary.

Figure 5:
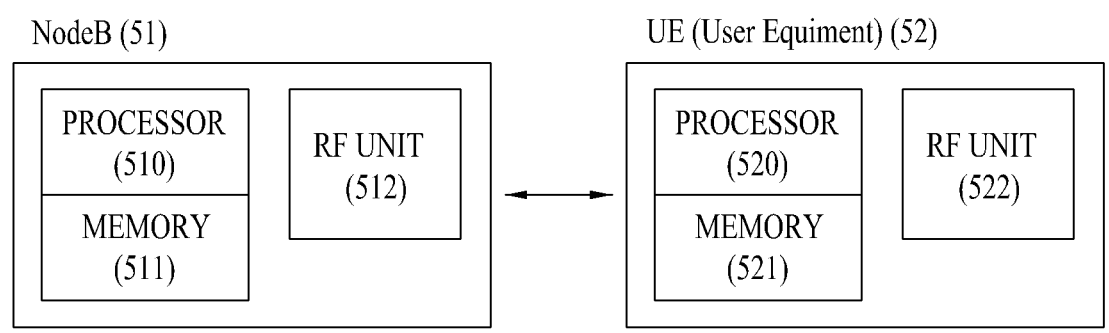
FIG. 5 is a block diagram of a communication system for implementing embodiments of the present invention.

With reference to FIG. 5, a wireless communication system includes a NodeB (or Base Station) 51 and one or more UEs 52. To facilitate a downlink, a transmitter may be provided in the NodeB 51, and a receiver may be provided in the UE 52.

To facilitate an uplink, a transmitter may be provided in the UE 52, and a receiver may be provided in the NodeB 51.

With continued reference to FIG. 5, the NodeB 51 may include a processor 510, a memory 511, and a radio frequency (RF) unit 512. The processor 510 may be configured to implement features, procedures and/or methods described herein with reference to various embodiments. The memory 511 is coupled with the processor 510 and stores a variety of information for operating the processor 510. The RF unit 512 is coupled with the processor 510 and transmits and/or receives a radio signal.

The UE 52 may include a processor 520, a memory 521, and an RF unit 522. The processor 520 may be configured to implement features, procedures and/or methods described herein with reference to various embodiments. The memory 521 is coupled with the processor 520 and stores a variety of information for operating the processor 520. The RF unit 522 is coupled with the processor 521 and transmits and/or receives a radio signal.

The NodeB 51 and/or the UE 52 may have a single antenna or multiple antennas. When at least one of the NodeB 51 and the UE 52 has multiple antennas, the wireless communication system may be referred to as a multiple input multiple output (MIMO) system.

A MIMO system uses multiple transmission (Tx) antennas and multiple reception (Rx) antennas to improve the efficiency of Tx/Rx data, relative to a conventional system using a single transmission (Tx) antenna and a single reception (Rx) antenna. In other words, the MIMO technology allows a transmission end or a reception end of a wireless communication system to use multiple antennas (hereinafter referred to as "multi-antenna"), so that the capacity or performance can be improved. For purposes of description, the term "MIMO" will be used to refer to a multi-antenna technology or system.

In a typical Orthogonal Frequency Division Multiplexing (OFDM) system, a transmitter attaches a cyclic prefix (CP) at the end of each OFDM symbol to combine the multipath signal effectively. In the receiver side, the attached cyclic prefix is removed right before a Fast Fourier Transform (FFT) or Discrete Fourier Transform (DFT) block to detect the originally intended signal. In addition, if it is assumed that the channel estimation at the receiver works properly and the maximum delayed path does not exceed the cyclic prefix length, the cyclic prefix has no effect on the performance of the system. That is, details regarding the cyclic prefix may be omitted in a description of an OFDM system without loss of generality. Hereinafter, further details regarding the cyclic prefix will generally not be presented. It is understood, however, that the cyclic prefix may be implemented in the actual deployed OFDM system.

Figure 6:
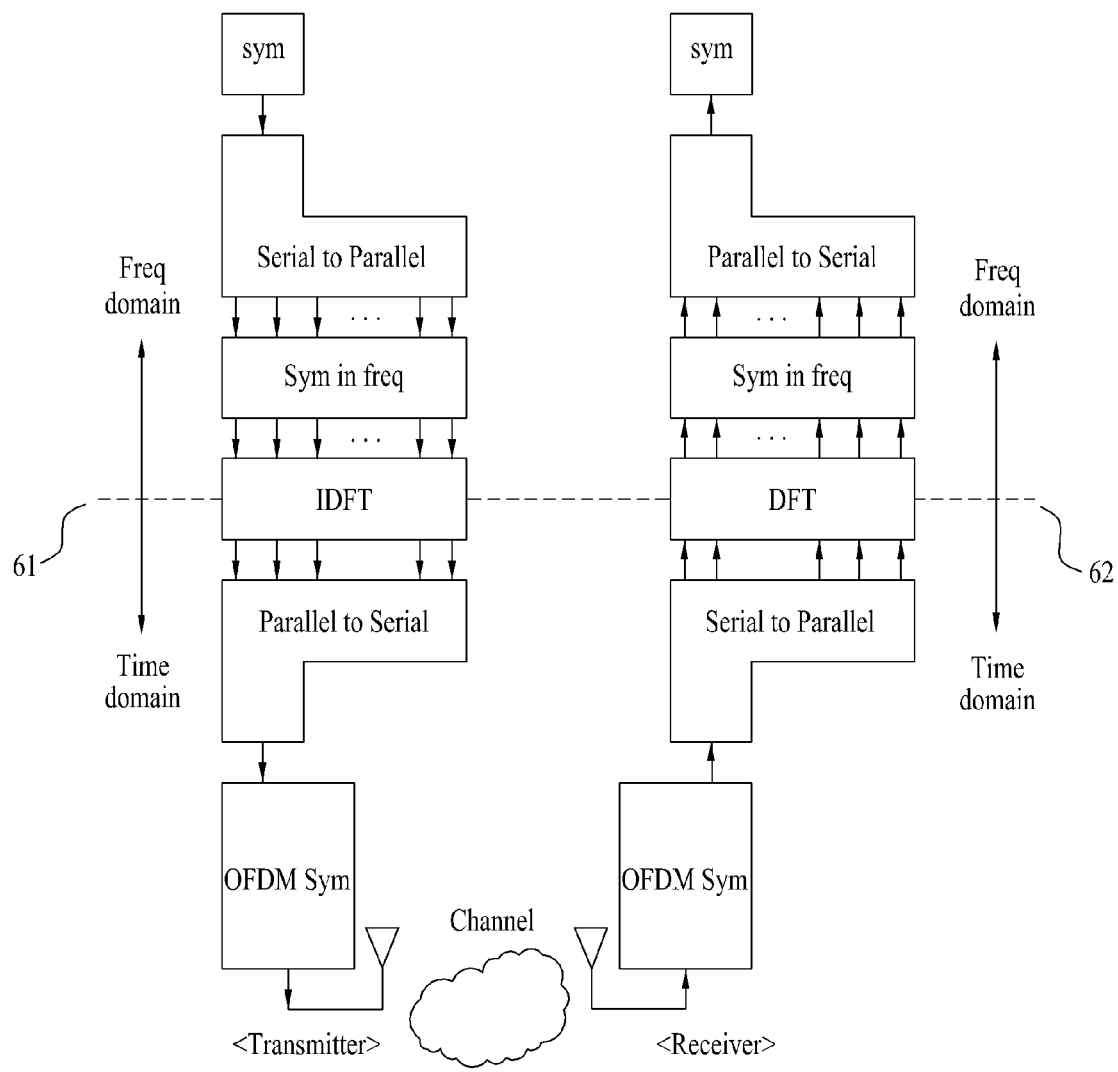
FIG. 6 is a block diagram of a communication system employing OFDM.

A mathematical modeling of a communication method and system will hereinafter be described in more detail. With reference to FIG. 6, a block diagram of a communication system is illustrated. The communication system includes an OFDM transmitter 61 and an OFDM receiver 62.

To facilitate the disclosure of mathematical equations and representations, FIG. 7 illustrates further details including signal indications. Because the OFDM transmitter 61 and the OFDM receiver 62 of FIG. 6 may have symmetric (or similar) structures, FIG. 7 illustrates a block diagram of only the OFDM transmitter 61.

As illustrated in FIG. 7, the length of the Inverse Discrete Fourier Transform (IDFT) 710 is assumed to be N such that the generated data vector in the frequency domain, $\overline{X}$, can be represented as a column vector (see Equation 1 below).

$$\overline{X} = [X_1, X_2, \ldots, X_N]^T \qquad \text{[Equation 1]}$$

A signal vector output by performing an IDFT or an Inverse Fast Fourier Transform (IFFT), $\overline{x}$, is a time domain signal which is generated by matrix multiplication as illustrated in Equation 2 below.

$$\overline{x} = [x_1, x_2, \ldots, x_N]^T = F^{-1}\overline{X} \qquad \text{[Equation 2]}$$

The IDFT or IFFT matrix, $F^{-1}$, is an inversion matrix of the Discrete Fourier Transform (DFT) or Fast Fourier Transform (FFT) matrix, F. Both matrices are shown in Equation 3 below.

$$F^{-1} = \frac{1}{\sqrt{N}} \begin{bmatrix} 1 & 1 & \cdots & 1 \\ 1 & e^{j2\pi\frac{1\times 1}{N}} & & e^{j2\pi\frac{(N-1)\times 1}{N}} \\ \vdots & \vdots & \ddots & \\ 1 & e^{j2\pi\frac{1\times(N-1)}{N}} & & e^{j2\pi\frac{(N-1)\times(N-1)}{N}} \end{bmatrix}; \qquad \text{[Equation 3]}$$

$$F = \frac{1}{\sqrt{N}} \begin{bmatrix} 1 & 1 & \cdots & 1 \\ 1 & e^{-j2\pi\frac{1\times 1}{N}} & & e^{-j2\pi\frac{1\times(N-1)}{N}} \\ \vdots & \vdots & \ddots & \\ 1 & e^{-j2\pi\frac{(N-1)\times 1}{N}} & & e^{-j2\pi\frac{(N-1)\times(N-1)}{N}} \end{bmatrix}$$

The received signal vector, $\overline{y}$ (see Equation 4), is a time-domain distorted signal corresponding to the transmitted signal, as distorted by the channel. The channel is represented by the matrix according to Equation 5 below.

$$\overline{y} = [y_1, y_2, \ldots, y_N]^T = HF^{-1}\overline{X} \qquad \text{[Equation 4]}$$

$$H = \begin{bmatrix} h_{1,1} & h_{1,2} & \cdots & h_{1,N} \\ h_{2,1} & h_{2,2} & & h_{2,N} \\ \vdots & \vdots & \ddots & \\ h_{N,1} & h_{N,2} & & h_{N,N} \end{bmatrix} \qquad \text{[Equation 5]}$$

In Equations 4 and 5, the channel is represented in matrix form in order to illustrate the multi-path delay effect. In the matrix form, a row index is a received sample time while the column index depicts the time of the transmitted sample interfering with the received sample. In addition, the background additive noise is not described in the disclosed model. Since details regarding the Additive White Gaussian Noise (AWGN) may be omitted without loss of generality, further details regarding the AWGN will not be presented in this disclosure.

At the receiver side, the received signal in the OFDM system should go through the FFT block to reconstruct the transmitted frequency domain signal. This recovered signal vector in the frequency domain, $\overline{Y}$, can be expressed according to Equation 6 below.

$$\overline{Y} = [Y_1, Y_2, \ldots, Y_N]^T = FHF^{-1}\overline{X} \qquad \text{[Equation 6]}$$

For purposes of description, the factors of Equation 6 (other than the transmitted signal X) can be separated from the transmitted signal and considered as an effective channel, $\hat{H}$, as shown in Equation 7 below.

[Equation 7]

$$\hat{H} \equiv F \times H \times F^{-1} = \frac{1}{\sqrt{N}} \begin{bmatrix} 1 & 1 & \cdots & 1 \\ 1 & e^{-j2\pi \frac{1 \times 1}{N}} & & e^{-j2\pi \frac{1 \times (N-1)}{N}} \\ \vdots & \vdots & \ddots & \\ 1 & e^{-j2\pi \frac{(N-1) \times 1}{N}} & & e^{-j2\pi \frac{(N-1) \times (N-1)}{N}} \end{bmatrix} \times$$

$$\begin{bmatrix} h_{1,1} & h_{1,2} & \cdots & h_{1,N} \\ h_{2,1} & h_{2,2} & & h_{2,N} \\ \vdots & \vdots & \ddots & \\ h_{N,1} & h_{N,2} & & h_{N,N} \end{bmatrix} \times$$

$$\frac{1}{\sqrt{N}} \begin{bmatrix} 1 & 1 & \cdots & 1 \\ 1 & e^{j2\pi \frac{1 \times 1}{N}} & & e^{j2\pi \frac{(N-1) \times 1}{N}} \\ \vdots & \vdots & \ddots & \\ 1 & e^{j2\pi \frac{1 \times (N-1)}{N}} & & e^{j2\pi \frac{(N-1) \times (N-1)}{N}} \end{bmatrix}$$

$$= \frac{1}{N} \begin{bmatrix} \vdots & \vdots & & \vdots \\ \sum_{l=1}^{N} e^{-j2\pi \frac{(m-1) \times (l-1)}{N}} h_{l,1} & \sum_{l=1}^{N} e^{-j2\pi \frac{(m-1) \times (l-1)}{N}} h_{l,2} & \cdots & \sum_{l=1}^{N} e^{-j2\pi \frac{(m-1) \times (l-1)}{N}} h_{l,N} \\ \vdots & \vdots & & \vdots \end{bmatrix} \times$$

$$\begin{bmatrix} 1 & 1 & \cdots & 1 \\ 1 & e^{j2\pi \frac{1 \times 1}{N}} & & e^{j2\pi \frac{(N-1) \times 1}{N}} \\ \vdots & \vdots & \ddots & \\ 1 & e^{j2\pi \frac{1 \times (N-1)}{N}} & & e^{j2\pi \frac{(N-1) \times (N-1)}{N}} \end{bmatrix}$$

$$= \frac{1}{N} \begin{bmatrix} \ddots & & \vdots & \\ & \sum_{k=1}^{N} \sum_{l=1}^{N} e^{-j2\pi \frac{(m-1) \times (l-1)}{N}} h_{l,k} e^{j2\pi \frac{(k-1) \times (n-1)}{N}} & \\ & \vdots & & \ddots \end{bmatrix}$$

$$\frac{1}{N} [\hat{H}_{m,n}|_{m=1,\cdots N; n=1,\cdots N}] \text{ where } \hat{H}_{m,n} = \sum_{k=1}^{N} \sum_{l=1}^{N} e^{-j2\pi \frac{(m-1) \times (l-1)}{N}} h_{l,k} e^{-j2\pi \frac{(k-1) \times (k-1)}{N}}$$

$$\sum_{k=1}^{N} \sum_{l=1}^{N} h_{l,k} e^{-j\frac{2\pi}{N}\{(m-1) \times (l-1) - (n-1) \times (k-1)\}}$$

The channel of Equation 5 is a general form and assumes a time-varying channel with quite a long delay; however, the channel can be further simplified by assuming a time-invariant channel with a relatively small delay (L), which is smaller than a cyclic prefix in an OFDM symbol. The cyclic prefix (CP) is a replica of a last part of an OFDM symbol and is located at the very first part of an OFDM symbol as shown in FIG. 7 (see CP 702). Due to the cyclic property of the OFDM symbol generated by the CP, even with timing synchronization error or channel delay, the contents in an OFDM symbol can be preserved at the receiver side. However, the order of contents in an OFDM symbol should be fixed because the OFDM symbol is cyclic shifted by an amount of time error or channel delay. These errors are easily recovered by linear phase adjustment based on digital signal processing theories and concepts.

Hereinafter, unless otherwise specified, as a channel model, a simpler channel, $\tilde{H}$, will be assumed (see Equation 8). In Equation 8, the channel response has a delay length of L, and the effect of the CP is taken into consideration.

$$\tilde{H} = \begin{bmatrix} \tilde{h}_{1,1} & 0 & \cdots & 0 & \tilde{h}_{L,1} & \tilde{h}_{L-1,1} & \cdots & \tilde{h}_{2,1} \\ \tilde{h}_{2,2} & \tilde{h}_{1,2} & 0 & \cdots & 0 & \tilde{h}_{L,2} & \tilde{h}_{L-1,2} & \cdots \\ \tilde{h}_{3,3} & \tilde{h}_{2,3} & \tilde{h}_{1,3} & 0 & \cdots & 0 & \tilde{h}_{L,3} & \cdots \\ \vdots & \vdots & \vdots & \vdots & & \vdots & \vdots & \vdots \\ & & & & \ddots & & \ddots & \\ 0 & \cdots & \cdots & 0 & \tilde{h}_{L,N} & \cdots & \tilde{h}_{2,N} & \tilde{h}_{1,N} \end{bmatrix}$$

[Equation 8]

If the channel is assumed to be a simpler channel as in Equation 8, the effective channel, $\hat{H}$, of Equation 7 can be further simplified as illustrated in Equation 9 below.

[Equation 9]

$$\hat{H} \equiv F \times \tilde{H} \times F^{-1} \frac{1}{\sqrt{N}} \begin{bmatrix} 1 & 1 & \cdots & 1 \\ 1 & e^{-j2\pi\frac{1\times 1}{N}} & & e^{-j2\pi\frac{1\times(N-1)}{N}} \\ \vdots & \vdots & \ddots & \\ 1 & e^{-j2\pi\frac{(N-1)\times 1}{N}} & & e^{-j2\pi\frac{(N-1)\times(N-1)}{N}} \end{bmatrix} \times$$

$$\begin{bmatrix} \tilde{h}_{1,1} & & \tilde{h}_{L,1} & \tilde{h}_{L-1,1} & \cdots & \tilde{h}_{2,1} \\ \tilde{h}_{2,2} & \tilde{h}_{1,2} & & \tilde{h}_{L,2} & \tilde{h}_{L-1,2} & \cdots \\ \tilde{h}_{3,3} & \tilde{h}_{2,3} & \tilde{h}_{1,3} & & \tilde{h}_{L,3} & \cdots \\ \vdots & \vdots & \vdots & \vdots & & \\ & & & \ddots & & \\ & & \tilde{h}_{L,N} & \cdots & \tilde{h}_{2,N} & \tilde{h}_{1,N} \end{bmatrix} \times$$

$$\frac{1}{\sqrt{N}} \begin{bmatrix} 1 & 1 & \cdots & 1 \\ 1 & e^{j2\pi\frac{1\times 1}{N}} & & e^{j2\pi\frac{(N-1)\times 1}{N}} \\ \vdots & \vdots & \ddots & \\ 1 & e^{j2\pi\frac{1\times(N-1)}{N}} & & e^{j2\pi\frac{(N-1)\times(N-1)}{N}} \end{bmatrix}$$

$$= \frac{1}{N} \begin{bmatrix} 1 & 1 & \cdots & 1 \\ 1 & e^{-j2\pi\frac{1\times 1}{N}} & & e^{-j2\pi\frac{1\times(N-1)}{N}} \\ \vdots & \vdots & \ddots & \\ 1 & e^{-j2\pi\frac{(N-1)\times 1}{N}} & & e^{-j2\pi\frac{(N-1)\times(N-1)}{N}} \end{bmatrix} \times$$

$$\begin{bmatrix} \cdots & \sum_{l=1}^{L} \tilde{h}_{l,1} e^{j2\pi\frac{(n-1)\times(1-1-(l-1))}{N}} & \cdots \\ \cdots & \sum_{l=1}^{L} \tilde{h}_{l,2} e^{j2\pi\frac{(n-1)\times(2-1-(l-1))}{N}} & \cdots \\ \vdots & \vdots & \vdots \\ \cdots & \sum_{l=1}^{L} \tilde{h}_{l,N-1} e^{j2\pi\frac{(n-1)\times(N-1-(l-1))}{N}} & \cdots \end{bmatrix}$$

$$= \frac{1}{N} \begin{bmatrix} 1 & 1 & \cdots & 1 \\ 1 & e^{-j2\pi\frac{1\times 1}{N}} & & e^{-j2\pi\frac{1\times(N-1)}{N}} \\ \vdots & \vdots & \ddots & \\ 1 & e^{-j2\pi\frac{(N-1)\times 1}{N}} & & e^{-j2\pi\frac{(N-1)\times(N-1)}{N}} \end{bmatrix} \times$$

$$\begin{bmatrix} & \vdots & \\ \cdots & \sum_{l=1}^{L} \tilde{h}_{l,k} e^{j2\pi\frac{(n-1)\times(k-1-(l-1))}{N}} & \cdots \\ & \vdots & \end{bmatrix}$$

$$= \frac{1}{N} \begin{bmatrix} \ddots & \vdots & \\ & \sum_{k=1}^{N}\sum_{l=1}^{N} e^{-j2\pi\frac{(m-1)\times(k-1)}{N}} \tilde{h}_{l,k} e^{j2\pi\frac{(n-1)\times(l-1)}{N}} & \\ & \vdots & \ddots \end{bmatrix}$$

$$= [\hat{H}_{m,n}|_{m=1,\cdots N; n=1,\cdots N}] \text{ where } \hat{H}_{m,n} = \frac{1}{N}\sum_{k=1}^{N}\sum_{l=1}^{N} e^{-j2\pi\frac{(m-1)\times(k-1)}{N}} \tilde{h}_{l,k} e^{j2\pi\frac{(n-1)\times(k-l)}{N}}$$

$$= \frac{1}{N}\sum_{k=1}^{N}\sum_{l=1}^{L} \tilde{h}_{l,k} e^{-j\frac{2\pi}{N}\{(m-1)\times(k-1)-(n-1)\times(k-l)\}}$$

$$= \frac{1}{N}\sum_{k=1}^{N}\sum_{l=1}^{L} \tilde{h}_{l,k} e^{-j\frac{2\pi}{N}\{k\times(m-n)-m+1+l\times(n-1)\}}$$

$$= \frac{1}{N}\sum_{k=1}^{N}\sum_{l=1}^{L} \tilde{h}_{l,k} e^{-j\frac{2\pi}{N}\{k\times(m-n)+l\times(n-1)-m+1\}}$$

The domain of the channel matrix in Equation 9 is different from that of the channel matrices in Equation 5 and 8 since the effective channel is represented in the frequency domain.

The following may also be assumed for further simplification:

First, a time domain channel, $\tilde{H}$, is governed by Rayleigh fading.

Second, multi-paths are uncorrelated with each other. That is, $E[\tilde{h}_{l,k}\tilde{h}^*_{m,k}]=0$ when $l \neq m$.

Third, all multi-paths go through the same Doppler frequency. Then, the time correlation of the l-th path channel could be simplified as illustrated in Equation 10 below.

$$E[\tilde{h}_{l,k}\tilde{h}_{l,k'}] = \sigma_l^2 \times r_h(k-k'), \text{ where } \sigma_l^2 \text{ is the power of the } l\text{-th path} \quad [\text{Equation 10}]$$

It should be noted that, in Equation 10, the correlation part between channels, $r_h(k-k')$, is solely dependent on the time difference and not the delayed path.

The channel correlation between sub-carriers can be calculated as illustrated in Equation 11.

$$E[\hat{H}_{m,n}\hat{H}^*_{m,p}] = E\left[\frac{1}{N}\sum_{k=1}^{N}\sum_{l=1}^{L}\tilde{h}_{l,k}e^{-j\frac{2\pi}{N}\{k\times(m-n)+l\times(n-1)-m+1\}} \times \frac{1}{N}\sum_{k'=1}^{N}\sum_{l'=1}^{L}\tilde{h}^*_{l',k'}e^{j\frac{2\pi}{N}\{k'\times(m-p)+l\times(p-1)-m+1\}}\right]$$

$$= E\left[\frac{1}{N^2}\sum_{k=1}^{N}\sum_{k'=1}^{N}\sum_{l=1}^{L}\sum_{l'=1}^{L}\tilde{h}_{l,k}e^{-j\frac{2\pi}{N}\{k\times(m-n)+l\times(n-1)-m+1\}} \tilde{h}^*_{l',k'}e^{j\frac{2\pi}{N}\{k'\times(m-p)+l'\times(p-1)-m+1\}}\right]$$

$$= \frac{1}{N^2}\sum_{k=1}^{N}\sum_{k'=1}^{N}\sum_{l=1}^{L}\sum_{l'=1}^{L}E[\tilde{h}_{l,k}\tilde{h}^*_{l',k'}]\begin{array}{l}e^{-j\frac{2\pi}{N}\{k\times(m-n)+l\times(n-1)-m+1\}}\\e^{j\frac{2\pi}{N}\{k'\times(m-p)+l'\times(p-1)-m+1\}}\end{array}$$

↓ uncorrelation $$= \frac{1}{N^2}\sum_{k=1}^{N}\sum_{k'=1}^{N}\sum_{l=1}^{L}E[\tilde{h}_{l,k}\tilde{h}^*_{l,k'}]\begin{array}{l}e^{-j\frac{2\pi}{N}\{k\times(m-n)+l\times(n-1)-m+1\}}\\e^{j\frac{2\pi}{N}\{k'\times(m-p)+l\times(p-1)-m+1\}}\end{array}$$

$$= \frac{1}{N^2}\sum_{k=1}^{N}\sum_{k'=1}^{N}\sum_{l=1}^{L}\sigma_l^2\times r_h(k-k')\times e^{-j\frac{2\pi}{N}\{k\times(m-n)-k'\times(m-p)+l\times(n-1)-l\times(p-1)\}}$$

$$= \frac{1}{N^2}\sum_{k=1}^{N}\sum_{k'=1}^{N}\sum_{l=1}^{L}r_h(k-k')\times e^{-j\frac{2\pi}{N}\{k\times(m-n)-k'\times(m-p)\}}\times\sigma_l^2\times e^{-j\frac{2\pi}{N}\{l\times(n-p)\}}$$

$$= \frac{1}{N^2}\sum_{k=1}^{N}\sum_{k'=1}^{N}\left[r_h(k-k')\times e^{-j\frac{2\pi}{N}\{k\times(m-n)-k'\times(m-p)\}}\sum_{l=1}^{L}\sigma_l^2\times e^{-j\frac{2\pi}{N}\{l\times(n-p)\}}\right]$$

As described earlier, effects of multipath cause the channel response to become time variant, which destroys the orthogonality between subcarriers. If the orthogonality between subcarriers is not maintained, then the subcarriers interfere with each other, generating what is referred to as inter carrier interference (ICI). The ICI can significantly degrade the performance of OFDM. Embodiments of the present invention are directed to reducing or eliminating the ICI.

Without ICI, the received signal in an m-th subcarrier is just the channel-gained m-th element of Y of Equation 6 since the effective channel falls into a diagonal matrix (see Equation 12 below).

$$Y_m = [\overline{Y}]_m = [FHF^{-1}X]_m = [\text{diag}(H)X]_m = H_{m,m}X_m \quad [\text{Equation 12}]$$

If the ICI is assumed to exist (or to be present), the received signal in the m-th subcarrier is a signal interfered by signals in other subcarriers (see Equation 13). In Equation 13, the first term is a desired signal and the second term is an ICI term (or component).

$$Y_m = [\overline{Y}]_m = \sum_{q=1}^{N}\hat{H}_{m,q}X_q = \hat{H}_{m,m}X_m + \sum_{\substack{q=1\\q\neq m}}^{N}\hat{H}_{m,q}X_q \quad [\text{Equation 13}]$$

The power of the ICI in the m-th subcarrier is calculated in Equation 14 below.

$$P_{ICI,m} = E\left[\left|\sum_{\substack{n=1\\n\neq m}}^{N}\hat{H}_{m,n}X_n\right|^2\right] \quad [\text{Equation 14}]$$

-continued $$= E\left[\left(\sum_{\substack{n=1\\n\neq m}}^{N}\hat{H}_{m,n}X_n\right)\left(\sum_{\substack{p=1\\p\neq m}}^{N}\hat{H}_{m,p}X_p\right)^*\right]$$

$$= E\left[\sum_{\substack{n=1\\n\neq m}}^{N}\sum_{\substack{p=1\\p\neq m}}^{N}\hat{H}_{m,n}\hat{H}_{m,p}X_nX_p^*\right]$$

$$= E\left[\sum_{\substack{n=1\\n\neq m}}^{N}\hat{H}_{m,n}\hat{H}^*_{m,n}X_nX_n^* + \sum_{\substack{n=1\\n\neq m}}^{N}\sum_{\substack{p=1\\p\neq m,n}}^{N}\hat{H}_{m,n}\hat{H}^*_{m,p}X_nX_p^*\right]$$

$$= \sum_{\substack{n=1 \\ n \neq m}}^{N} E[|\hat{H}_{m,n}|^2] E[|X_n|^2] +$$

$$\sum_{\substack{n=1 \\ n \neq m}}^{N} \sum_{\substack{p=1 \\ p \neq m,n}}^{N} E[\hat{H}_{m,n} \hat{H}_{m,p}^*] E[X_n X_p^*]$$

$$= \sum_{\substack{n=1 \\ n \neq m}}^{N} E[|\hat{H}_{m,n}|^2] + \sum_{\substack{n=1 \\ n \neq m}}^{N} \sum_{\substack{p=1 \\ p \neq m,n}}^{N} E[\hat{H}_{m,n} \hat{H}_{m,p}^*] E[X_n X_p^*]$$

In Equation 14, it is assumed that the average energy of modulation symbols is normalized to 1 and that the channel and transmitted symbols are uncorrelated. From Equation 14, it can be observed that the first term and the first part of the second term are dependent on the channel, which means that these portions may not be controlled artificially. The only controllable component is the last part of the second term, $E[X_n X_p^*]$. If this last part of the second term can be reduced or, even better, made to be negative (i.e., less than zero), then the power of the ICI is reduced. Therefore, one aspect of reducing the ICI involves reducing or minimizing the value of $E[X_n X_p^*]$. $E[X_n X_p^*]$ can be interpreted as an average correlation between transmission symbols.

The correlation between transmission symbols can be assumed to be wide sense stationary, which makes the correlation dependent on only time difference and not the time shift. Accordingly, the correlation $E[X_n X_p^*]$ can be further calculated as illustrated in Equation 15 below.

$$E[X_n X_{n-\tau}^*] = E[X_n X_{n-\tau}^*] = r_x(n, n-\tau) \quad \text{[Equation 15]}$$
$$\downarrow WSS$$
$$= r_x(\tau) \text{ where } \tau = n - p$$

As illustrated in Equation 16 below, the ICI power of Equation 14 can be further calculated using Equation 11 above.

$$P_{ICI,m} = \sum_{\substack{n=1 \\ n \neq m}}^{N} E[|\hat{H}_{m,n}|^2] + \sum_{\substack{n=1 \\ n \neq m}}^{N} \sum_{\substack{p=1 \\ p \neq m,n}}^{N} E[\hat{H}_{m,n} \hat{H}_{m,p}^*] E[X_n X_p^*]$$

$$= \sum_{\substack{n=1 \\ n \neq m}}^{N} E[|\hat{H}_{m,n}|^2] +$$

$$\sum_{\substack{n=1 \\ n \neq m}}^{N} \sum_{\substack{p=1 \\ p \neq m,n}}^{N} \left\{ r_x(\tau) \times \frac{1}{N^2} \sum_{k=1}^{N} \sum_{k'=1}^{N} \left[ \begin{array}{c} r_h(k-k') \times e^{-j\frac{2\pi}{N}\{k \times (m-n) - k' \times (m-p)\}} \\ \sum_{l=1}^{L} \sigma_l^2 \times e^{-j\frac{2\pi}{N}\{l \times (n-p)\}} \end{array} \right] \right\}$$

where $\tau = n - p$

[Equation 16]

Generally, information symbols generated at the source are uncorrelated with each other. Therefore, the transmitted symbols are also uncorrelated, which renders the correlation between symbols equal to 0 (see Equation 17).

$$r_x(\tau) = E[X_n X_{n-\tau}^*] = 0 \quad \text{[Equation 17]}$$

By applying Equation 17 to Equation 14, the ICI power is shown to be upper-bound by its summation of channel gains (see Equation 18).

$$P_{ICI,m} = \sum_{\substack{n=1 \\ n \neq m}}^{N} E[|\hat{H}_{m,n}|^2] + \sum_{\substack{n=1 \\ n \neq m}}^{N} \sum_{\substack{p=1 \\ p \neq m,n}}^{N} E[\hat{H}_{m,n} \hat{H}_{m,p}^*] E[X_n X_p^*] \leq \quad \text{[Equation 18]}$$

$$\sum_{\substack{n=1 \\ n \neq m}}^{N} E[|\hat{H}_{m,n}|^2]$$

Unfortunately, the channel gains cannot be controlled. Therefore, according to one embodiment, the ICI power is reduced (to be below the upper bound of Equation 18) by rendering the correlation between transmitted symbols to be negative in value. That is, the correlation of transmission symbols should be changed to be nonzero. In order to render the correlation nonzero, the uncorrelation between symbols should be broken. According to one approach, a differential encoding of transmission symbols is utilized. In differential encoding, the value of a current symbol depends on a previous symbol. If M-Phase Shift Keying (M-PSK) is assumed, a differentially encoded transmitted symbol on an m-th subcarrier is defined in Equation 19:

$$X_n = X_{n-1} e^{j\frac{2\pi}{M} b_n} \text{ where } b_n \in \{0, 1, 2, \cdots, M-1\} \quad \text{[Equation 19]}$$

In Equation 19, $b_n$ is an n-th information symbol represented by M-decimal. The correlation of symbols is calculated in Equation 20:

$$r_x(\tau) = E[X_n X_{n-\tau}^*] = E[X_n X_{n-\tau}^*] \quad \text{[Equation 20]}$$
$$= E[X_{n-1} e^{j\frac{2\pi}{M} b_n} X_{n-\tau}^*]$$
$$= E[X_{n-2} e^{j\frac{2\pi}{M} b_{n-1}} e^{j\frac{2\pi}{M} b_n} X_{n-\tau}^*]$$

-continued
$$= E[X_{n-3} e^{j\frac{2\pi}{M} b_{n-2}} e^{j\frac{2\pi}{M} b_{n-1}} e^{j\frac{2\pi}{M} b_n} X_{n-\tau}^*]$$
$$= \cdots$$
$$= E[X_{n-\tau} e^{j\frac{2\pi}{M} b_{n-(\tau-1)}} \cdots e^{j\frac{2\pi}{M} b_{n-1}} e^{j\frac{2\pi}{M} b_n} X_{n-\tau}^*]$$
$$= E[e^{j\frac{2\pi}{M} b_{n-(\tau-1)}} \cdots e^{j\frac{2\pi}{M} b_{n-1}} e^{j\frac{2\pi}{M} b_n} X_{n-\tau} X_{n-\tau}^*]$$

-continued $$= E[e^{j\frac{2\pi}{M}b_{n-(\tau-1)}} \cdots e^{j\frac{2\pi}{M}b_{n-1}} e^{j\frac{2\pi}{M}b_n}] E[X_{n-\tau}X_{n-\tau}^*]$$

$$= E[e^{j\frac{2\pi}{M}b_{n-(\tau-1)}} \cdots e^{j\frac{2\pi}{M}b_{n-1}} e^{j\frac{2\pi}{M}b_n}]$$

$$= \prod_{q=n-(\tau-1)}^{n} E[e^{j\frac{2\pi}{M}b_q}]$$

Regarding Equation 20, it should be noted that the $$E[e^{j\frac{2\pi}{M}b_q}]$$

term is solely dependent on the constellation points of modulation. Generally, modulation constellations have a symmetric structure such that $$E[e^{j\frac{2\pi}{M}b_q}]$$

is equal to zero. This is because $$E[e^{j\frac{2\pi}{M}b_q}]$$

is but the vector summation of points on a unit circle. Because the points are located uniformly and symmetrically on the unit circle, the summation value is equal to zero. For example, with reference to general MPSK, the summation value is equal to zero, as illustrated in Equation 21.

$$E[e^{j\frac{2\pi}{M}b_q}] = \sum_{k=0}^{M-1} \frac{1}{M} e^{j\frac{2\pi}{M}k} = \frac{1}{M} \sum_{k=0}^{M-1} e^{j\frac{2\pi}{M}k} = 0 \quad \text{[Equation 21]}$$

All modulation schemes employing symmetric constellations will also have a summation value of zero, which will not aid in reducing the ICI. According to one embodiment, the constellation points are rendered asymmetric via differential encoding—i.e., differential encoding with on-off—which will be described in more detail below. This approach will be described with reference to Equation 22 below.

$$X_n = \begin{cases} X_{n-1} e^{j\frac{2\pi}{M}b_n} & b_n \neq 0 \\ 0 & b_n = 0 \end{cases} \quad \text{[Equation 22]}$$

where $b_n \in \{0, 1, 2, \cdots, M-1\}$

According to the differential encoding of Equation 22, if the current symbol is the same as the previous symbol, transmission is turned off. Otherwise, the current symbol is differentially encoded as usual. Based on the differential encoding with on-off of Equation 22, the $$E[e^{j\frac{2\pi}{M}b_q}]$$

will be nonzero as follows:

$$E[e^{j\frac{2\pi}{M}b_q}] = \frac{1}{M} \sum_{k=1}^{M-1} e^{j\frac{2\pi}{M}k} = \frac{1}{M} \sum_{k=0}^{M} e^{j\frac{2\pi}{M}k} - \frac{1}{M} = -\frac{1}{M} \quad \text{[Equation 23]}$$

Due to the nonzero value of the average sum of the constellation points, the correlation between symbols has a nonzero value (see Equation 24 below).

$$r_x(\tau) = E[X_n X_{n-\tau}^*] \quad \text{[Equation 24]}$$

$$= \prod_{q=n-(\tau-1)}^{n} E[e^{j\frac{2\pi}{M}b_q}]$$

$$= \prod_{q=n-(\tau-1)}^{n} \left(-\frac{1}{M}\right)$$

$$= \left(-\frac{1}{M}\right)^{\tau}$$

Applying Equation 23 to Equation 16, the ICI power is expressed in Equation 25 below.

$$P_{ICI,m} = \sum_{\substack{n=1 \\ n\neq m}}^{N} E[|\hat{H}_{m,n}|^2] + \sum_{\substack{n=1 \\ n\neq m}}^{N} \sum_{\substack{p=1 \\ p\neq m,n}}^{N} \left\{\left(-\frac{1}{M}\right)^{\tau} \times \frac{1}{N^2}\right. \quad \text{[Equation 25]}$$

$$\sum_{k=1}^{N} \sum_{k'=1}^{N} \left[r_h(k-k') \times e^{-j\frac{2\pi}{N}\{k\times(m-n)-k'\times(m-p)\}}\right.$$

$$\left.\left.\sum_{l=1}^{L} \sigma_l^2 \times e^{-j\frac{2\pi}{N}\{l\times(n-p)\}}\right]\right\}$$

where $\tau = n - p$

Not all components of the correlation value of Equation 25 are negative in value. Rather, the components have alternating polarity, i.e., $$-\frac{1}{M}, \frac{1}{M^2}, -\frac{1}{M^3}, \frac{1}{M^4}, \cdots.$$

However, it will be appreciated that the ICI mainly results (or derives) from the first few terms of the above sequence and that the correlation value diminishes at the speed of square power. As such, the very first term, $r_x(\tau=1)$, plays a main role in determining the ICI power. According to the embodiment described with reference to Equation 22, the differential encoding reduces the ICI power.

Figure 8A:
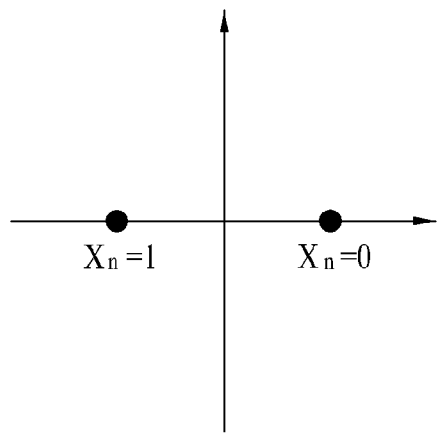
FIGS. 8A, 8B and 8C illustrate an application of differential encoding to a BPSK modulation scheme according to one embodiment.
Figure 8B:
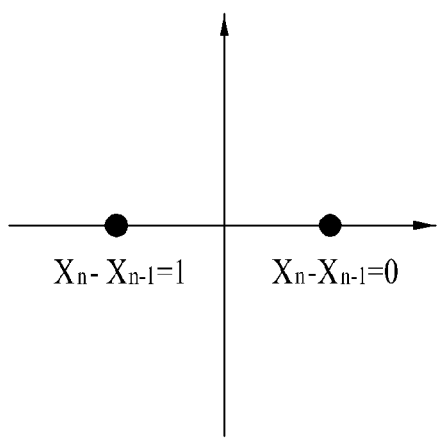
Figure 8C:
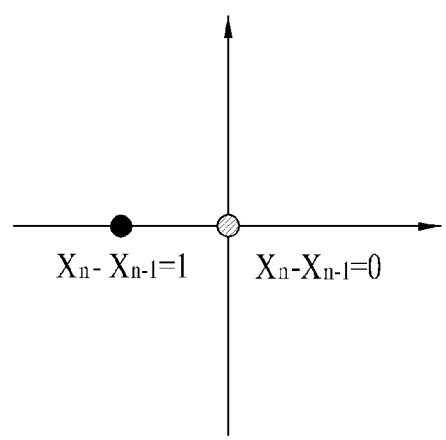

An embodiment based on binary phase shift keying (BPSK) will now be described with reference to FIGS. 8A, 8B and 8C. FIG. 8A illustrates a conventional BPSK constellation. FIG. 8B illustrates differential encoding as applied to a conventional BPSK constellation. With reference to FIG. 8B, the value of the encoded symbol depends on the difference between the values of the current symbol ($X_n$) and the previous symbol ($X_{n-1}$). When the value of the current symbol is equal to the value of the previous symbol, the difference of the two corresponds to an encoded symbol of 0 in the differential BPSK constellation. In differential encoding with on-off, as illustrated with reference to FIG. 8C, the position of the encoded symbol of 0 in the differential BPSK constellation is moved to the origin (i.e., the intersection of the complex and real axes). As such, an asymmetric constellation (i.e., a constellation asymmetric about the complex and real axes) is produced.

Figures 9A, 9B, 9C, 9D:
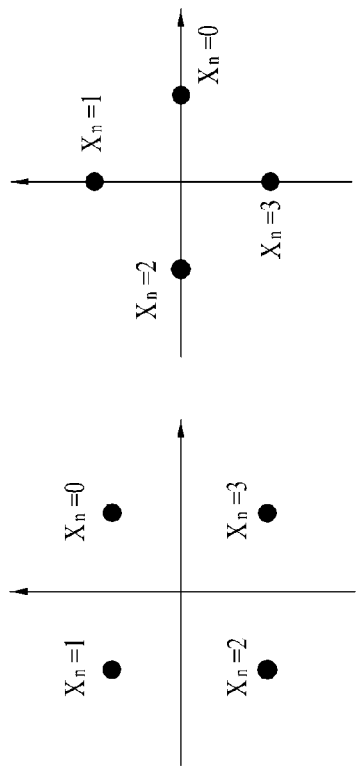
FIGS. 9A, 9B, 9C and 9D illustrate an application of differential encoding to a QPSK modulation scheme according to one embodiment.

An embodiment based on quadrature phase shift keying (QPSK) will now be described with reference to FIGS. 9A, 9B, 9C and 9D. FIG. 9A illustrates a conventional QPSK constellation. FIG. 9B illustrates the conventional QPSK constellation of FIG. 9A, but rotated in a clockwise direction by 45 degrees. As such, the encoded values of 0 and 2 fall on the real axis, and the encoded values of 1 and 3 fall on the complex axis. FIG. 9C illustrates differential encoding as applied to the rotated conventional constellation of FIG. 9B. As described earlier regarding FIG. 8B, the value of the encoded symbol depends on the difference between the values of the current symbol ($X_n$) and the previous symbol ($X_{n-1}$).

Referring back to FIG. 9C, when the value of the current symbol is equal to the value of the previous symbol, the difference of the two corresponds to an encoded symbol of 0 in the rotated QPSK constellation. In differential encoding with on-off, as illustrated with reference to FIG. 9D, the position of the encoded symbol of 0 (in the rotated QPSK constellation of FIG. 9C) is moved to the origin. As such, an asymmetric constellation is produced.

For purposes of illustration, constellation points are rotated in the manner described above. However, it is understood that the aspects and features described herein are also applicable to the points of a more general QPSK constellation.

Figure 10D:
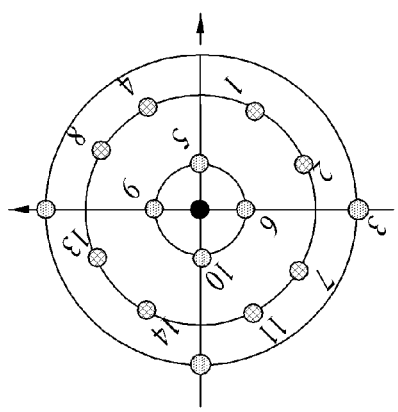
FIGS. 10A, 10B, 10C and 10D illustrate an application of differential encoding to a 16-QAM modulation scheme according to one embodiment.
Figure 10C:
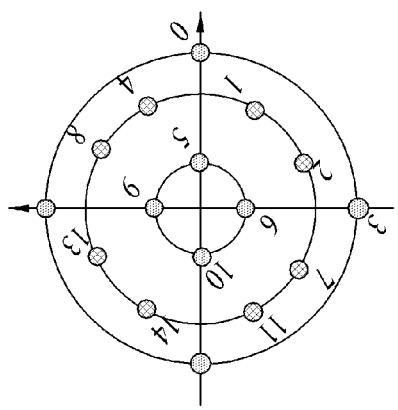
Figure 10B:
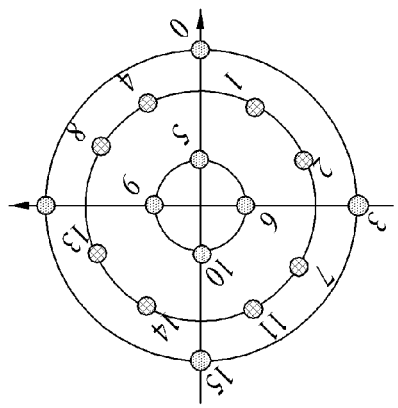
Figure 10A:
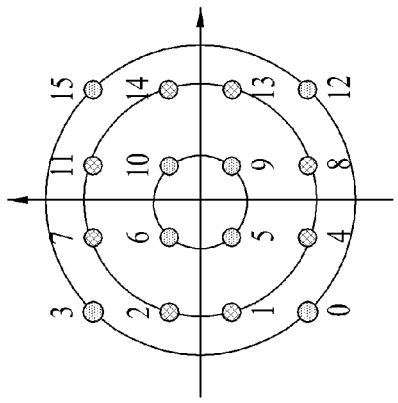

It is also understood that, according to other embodiments, other modulation schemes (e.g., modulation schemes other than MPSK) may be modified in a similar manner in order to reduce the ICI. For example, according to one embodiment, a 16-QAM (Quadrature Amplitude Modification) scheme is modified. The points of a 16-QAM constellation may be viewed as an overlaying of three different MPSK constellations. As illustrated in FIG. 10A, the three constellations are based on circles of different diameters (for example, the encoded values of 5, 6, 9 and 10 are based on the inner-most circle having the smallest diameter).

An embodiment based on 16-QAM will now be described with reference to FIGS. 10A, 10B, 10C and 10D. FIG. 10A illustrates a conventional 16-QAM constellation. FIG. 10B illustrates the conventional 16-QAM constellation of FIG. 10A, but rotated in a counter-clockwise direction by 135 degrees. FIG. 10C illustrates differential encoding as applied to the rotated conventional constellation of FIG. 10B. In differential encoding with on-off, as illustrated with reference to FIG. 10D, the position of the encoded symbol of 0 (in the rotated 16-QAM constellation of FIG. 10C) is moved to the origin. As such, an asymmetric constellation is produced.

In FIG. 10B, for purposes of illustration, constellation points are rotated in the manner described above. However, it is understood that the aspects and features described herein are also applicable to the points of a more general 16-QAM constellation.

As previously described—generally, information symbols generated at the source are uncorrelated with each other. Therefore, the transmitted symbols are also uncorrelated, which renders the correlation between symbols equal to 0 (see Equation 26).

$$r_x(\tau) = E[X_n X^*_{n-\tau}] = 0 \quad \text{[Equation 26]}$$

By applying Equation 26 to Equation 14, the ICI power is shown to be upper-bound by its summation of channel gains (see Equation 27).

$$P_{ICI,m} = \sum_{\substack{n=1 \\ n \neq m}}^{N} E[|\hat{H}_{m,n}|^2] + \sum_{\substack{n=1 \\ n \neq m}}^{N} \sum_{\substack{p=1 \\ p \neq m, n}}^{N} E[\hat{H}_{m,n} \hat{H}^*_{m,p}] E[X_n X^*_p] \leq \quad \text{[Equation 27]}$$

$$\sum_{\substack{n=1 \\ n \neq m}}^{N} E[|\hat{H}_{m,n}|^2]$$

Unfortunately, the channel gains cannot be controlled. Therefore, according to one embodiment, the ICI power is reduced (to be below the upper bound of Equation 27) by rendering the correlation between transmitted symbols to be negative in value. That is, the correlation of transmission symbols is changed to be nonzero. In order to render the correlation nonzero, the uncorrelation between symbols should be broken. According to one approach, a differential encoding of transmission symbols is utilized. In differential encoding, the value of a current symbol depends on a previous symbol.

Figure 11A:
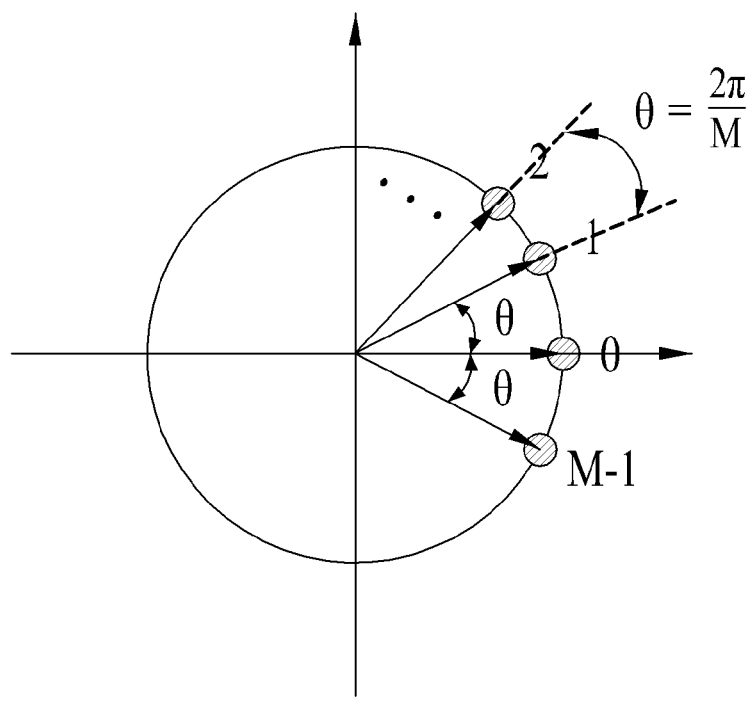
FIGS. 11A and 11B illustrate an application of differential encoding to an MPSK modulation scheme according to one embodiment.
Figure 11B:
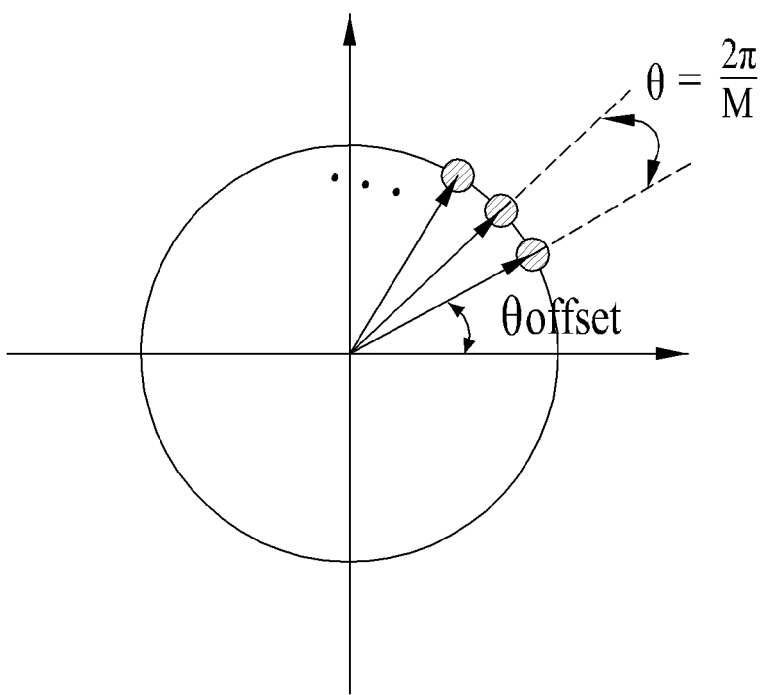

If MPSK (M-Phase Shift Keying) is assumed, the corresponding constellation may have the form illustrated in FIG. 11A. As illustrated in FIG. 11A, the constellation has M points, which are spaced apart from each other by $2\pi/M$ radians. The starting point of the constellation (i.e., point "0") is located on the x-axis. With reference to FIG. 11B, point "0" is located at an offset (i.e., $\theta_{offset}$) relative to the x-axis. However, similar to FIG. 11A, the M points of the constellation of FIG. 11B are still spaced apart from each other by $2\pi/M$ radians. A constellation having such an offset may be modified to have the form illustrated in FIG. 11A without affecting the properties of general MPSK. Hereinafter, unless otherwise specified, the constellation points of MPSK mapped from symbol $z_n$ have no offset phase (see, e.g., FIG. 3A and Equation 28 below).

$$Z_n = e^{j\frac{2\pi}{M} z_n} \text{ where } z_n \in \{0, 1, 2, \cdots, M-1\} \quad \text{[Equation 28]}$$

Assuming that an MPSK constellation is mapped as in Equation 28, a differentially encoded transmitted symbol on an n-th subcarrier is expressed in Equation 29 below.

$$X_n = e^{j\frac{2\pi}{M}(b_n + b_{n-1})} \quad \text{[Equation 29]}$$
$$= X_{n-1} e^{j\frac{2\pi}{M} b_n} \text{ where } b_n \in \{0, 1, 2, \cdots, M-1\}$$

In Equation 29, $b_n$ is an n-th information symbol represented by M-decimal. The differential encoding illustrated in Equation 29 is different from a differential encoding that involves encoding based on the difference $b_n - b_{n-1}$. However, according to Equation 29, all constellation points are located on the unit circle such that the differential encoding based on $b_n + b_{n-1}$ gives the same effect as that based on $b_n - b_{n-1}$.

Also, the modulation operator (i.e., mod M) is omitted from the expression $b_n + b_{n-1}$ (see Equation 29) because ($b_n + b_{n-1}$) mod M has no effect on the phase change along the unit circle. The differential encoding of Equation 29 can be interpreted as a modulation with an added phase from a previous symbol. The phase of the previous symbol is added as an offset, e.g., $\theta_{offset}$, and, then, modulation mapping starts with the phase offset, $\theta_{offset}$ similar to the mapping shown in FIG.

11B. This can also be viewed as a constellation rotation of a current symbol according to the phase of the previous symbol.

Figure 12A:
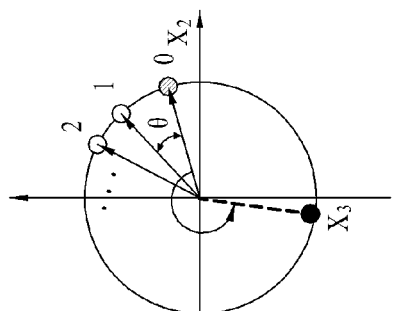
FIGS. 12A, 12B, 12C and 12D illustrate an application of differential encoding to an MPSK modulation scheme according to one embodiment.
Figure 12B:
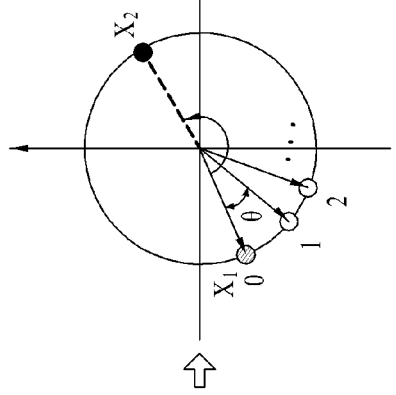

An example of differentially encoded symbols will be described with reference to FIGS. 12A, 12B, 12C and 12D. As illustrated in FIG. 12A, the first symbol $X_0$ is offset from the x-axis by phase offset $\theta_{offset1}$. The position of this symbol will be used as a starting (or reference) point in the generation of the following symbol. As illustrated in FIG. 12B, the position of the following symbol $X_1$ is based on the phase offset of the previous symbol $X_0$. That is, the position of the previous symbol $X_0$ is used as a starting point in the generation of the following symbol $X_1$, and, accordingly, the angle $\theta_{offset1}$ is added as an offset in generating the symbol $X_1$.

Figure 12C:
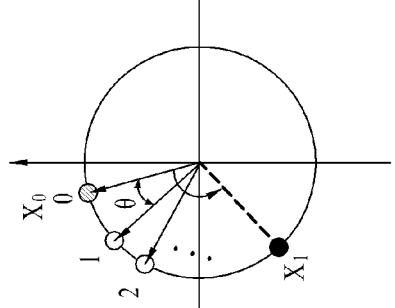
Figure 12D:
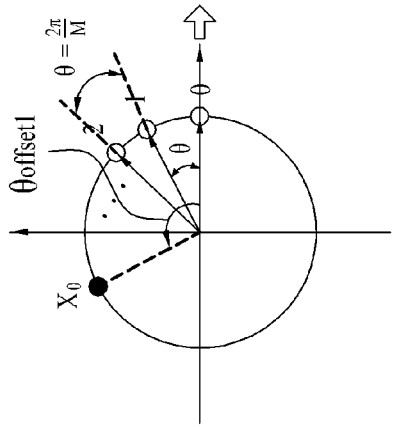

Similarly, as illustrated in FIG. 12C, the position of the following symbol $X_2$ is based on the phase offset of the previous symbol $X_1$. Also, as illustrated in FIG. 12D, the position of the following symbol $X_3$ is based on the phase offset of the previous symbol $X_2$.

Hereinafter, differential encoding will also be referred to as differential encoding with an added phase of the previous symbol, unless otherwise specified.

According to embodiments of the present invention, differential encoding schemes are based on constellations that are substantially similar to conventional MPSK constellations if the constellation points are equally spaced from each other. The differentially encoded symbols correspond to constellation points of the conventional MPSK constellations, and the constellation points of the differential encoding scheme correspond to a shifted mapping of the conventional constellation.

With reference to Equation 29, the constellation point of the current symbol is a multiplication of the previous symbol by the ordinary constellation point of the current symbol (i.e., the constellation point of the current symbol under a conventional MPSK scheme). As such, the correlation of symbols may be calculated as illustrated in Equation 30 below.

$$r_x(\tau) = E[X_n X_{n-\tau}^*] \quad \text{[Equation 30]}$$
$$= E[X_n X_{n-\tau}^*]$$
$$= E[X_{n-1} e^{j\frac{2\pi}{M}b_n} X_{n-\tau}^*]$$
$$= E[X_{n-2} e^{j\frac{2\pi}{M}b_{n-1}} e^{j\frac{2\pi}{M}b_n} X_{n-\tau}^*]$$
$$= E[X_{n-3} e^{j\frac{2\pi}{M}b_{n-2}} e^{j\frac{2\pi}{M}b_{n-1}} e^{j\frac{2\pi}{M}b_n} X_{n-\tau}^*]$$
$$= \cdots$$
$$= E[X_{n-\tau} e^{j\frac{2\pi}{M}b_{n-(\tau-1)}} \cdots e^{j\frac{2\pi}{M}b_{n-1}} e^{j\frac{2\pi}{M}b_n} X_{n-\tau}^*]$$
$$= E[e^{j\frac{2\pi}{M}b_{n-(\tau-1)}} \cdots e^{j\frac{2\pi}{M}b_{n-1}} e^{j\frac{2\pi}{M}b_n} X_{n-\tau} X_{n-\tau}^*]$$
$$= E[e^{j\frac{2\pi}{M}b_{n-(\tau-1)}} \cdots e^{j\frac{2\pi}{M}b_{n-1}} e^{j\frac{2\pi}{M}b_n}] E[X_{n-\tau} X_{n-\tau}^*]$$
$$= E[e^{j\frac{2\pi}{M}b_{n-(\tau-1)}} \cdots e^{j\frac{2\pi}{M}b_{n-1}} e^{j\frac{2\pi}{M}b_n}]$$
$$= \prod_{q=n-(\tau-1)}^{n} E[e^{j\frac{2\pi}{M}b_q}]$$

Regarding Equation 30, it should be noted that the $$E[e^{j\frac{2\pi}{M}b_q}]$$

term is solely dependent on the constellation points of modulation. Generally, modulation constellations have a symmetric structure such that $$E[e^{j\frac{2\pi}{M}b_q}]$$

is equal to zero. This is because $$E[e^{j\frac{2\pi}{M}b_q}]$$

is but the vector summation of points on a unit circle. Because the points are located uniformly and symmetrically on the unit circle, the summation value is equal to zero. For example, with reference to general MPSK, the summation value is equal to zero, as illustrated in Equation 31.

$$E[e^{j\frac{2\pi}{M}b_q}] = \sum_{k=0}^{M-1} \frac{1}{M} e^{j\frac{2\pi}{M}k} \quad \text{[Equation 31]}$$
$$= \frac{1}{M} \sum_{k=0}^{M-1} e^{j\frac{2\pi}{M}k}$$
$$= 0$$

All modulation schemes employing symmetric constellations will also have a summation value of zero, which will not aid in reducing the ICI. According to one embodiment, the constellation points are rendered asymmetric by utilizing a modified constellation.

Figure 13A:
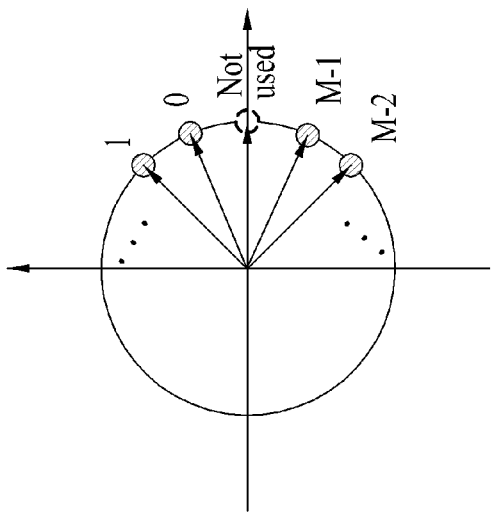
FIGS. 13A, 13B and 13C illustrate a generation of an (M+1)-PSK modulation scheme based on an M-PSK scheme.
Figure 13B:
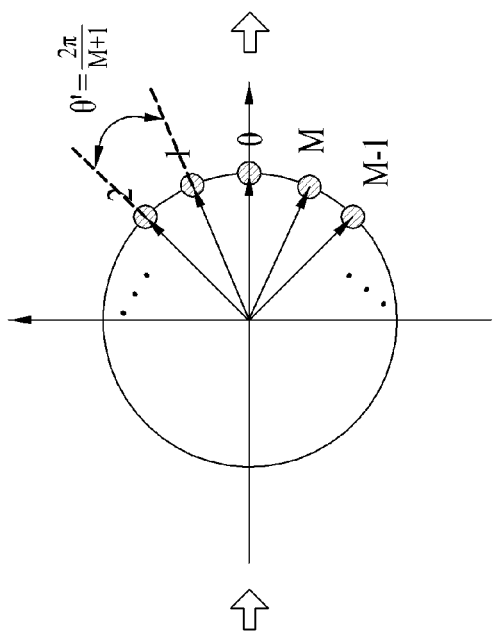
Figure 13C:
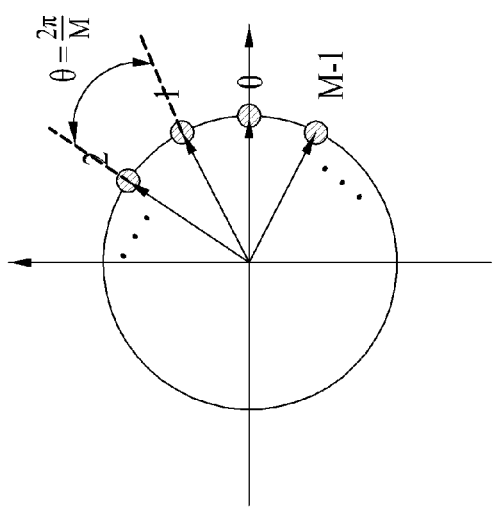

One approach will be described with reference to FIGS. 13A, 13B and 13C. A conventional MPSK constellation is illustrated in FIG. 13A. The constellation has M points, which are spaced apart from each other by $2\pi/M$ radians. As illustrated in FIG. 13B, the constellation of FIG. 13A is modified to include an additional constellation point. As such, the constellation of FIG. 13B has (M+1) points, which are spaced apart from each other by $2\pi/(M+1)$ radians. If an additional point (or points) is added to the constellation (e.g., the MPSK constellation is changed to an (M+1)-PSK constellation), the resulting constellation provides an additional point beyond the number of symbol points that is actually required. With reference to FIG. 13C, such an additional point (e.g., the point with a real component (i.e., a value on the real axis) of 1) may be reserved as a spare point or may simply not be used. Here, it is assumed that the points of the constellation are located on a circle of radius 1.

Figure 14A:
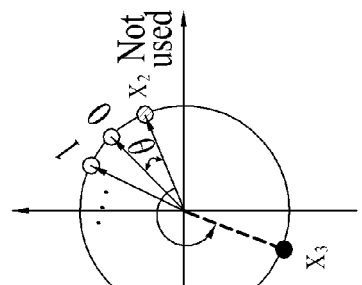
FIGS. 14A, 14B, 14C and 14D illustrate an application of differential encoding to an (M+1)-PSK modulation scheme according to one embodiment.
Figure 14B:
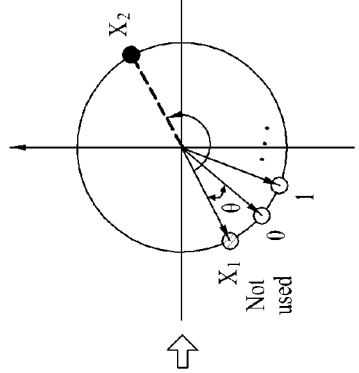

An application of differential encoding to the modified constellation of FIG. 13C will now be described with reference to FIGS. 14A, 14B, 14C and 14D and Equation 32. As illustrated in FIG. 14A, the first symbol $X_0$ is offset from the x-axis (on which the point that is not used is positioned) by phase offset $\theta_{offset2}$. The position of this symbol will be used as a starting (or reference) point in the generation of the following symbol. As illustrated in FIG. 14B, the position of the following symbol $X_1$ is based on the phase offset of the previous symbol $X_0$. That is, the position of the previous symbol $X_0$ is used as a starting point in the generation of the following symbol $X_1$, and, accordingly, the angle $\theta_{offset2}$ is added as an offset in generating the symbol $X_1$.

Figure 14C:
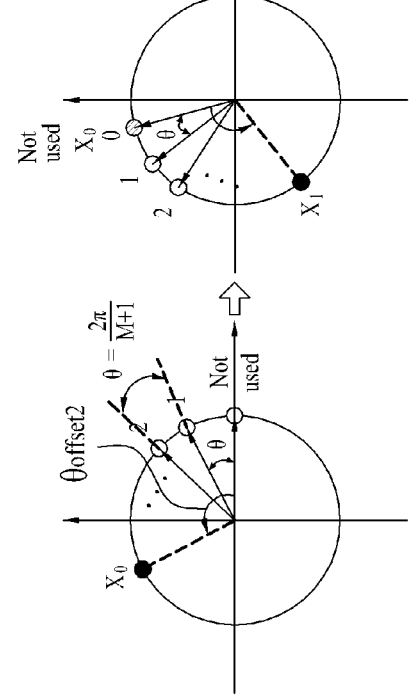
Figure 14D:
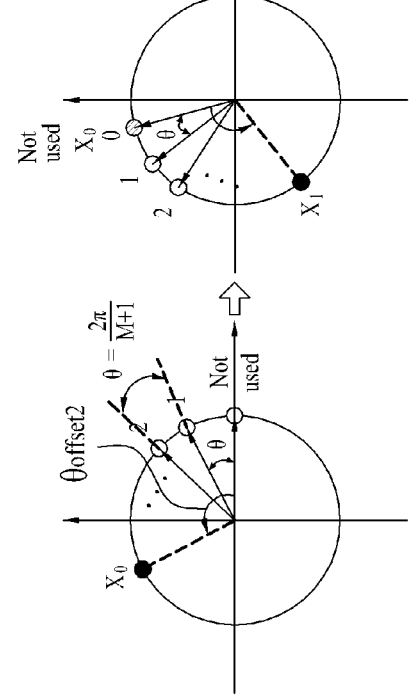

Similarly, as illustrated in FIG. 14C, the position of the following symbol $X_2$ is based on the phase offset of the previous symbol $X_1$. Also, as illustrated in FIG. 14D, the position of the following symbol $X_3$ is based on the phase offset of the previous symbol $X_2$.

Based on an (M+1)-PSK constellation (e.g., the constellation of FIG. 13C), a differentially encoded transmitted symbol on an n-th subcarrier is expressed according to Equation 32 below.

$$X_n = X_{n-1} f(b_n) \quad \text{[Equation 32]}$$
$$= X_{n-1} f(b_n)$$

where $$b_n \in \{0, 1, 2, \ldots, M-1\} \text{ and } f(b_n) = e^{j\frac{2\pi}{M+1}(b_n+1)}$$

It should be noted that the previous symbol point will not be used at this time in differential mapping. That is, the M constellation points out of (M+1) points in an (M+1)-PSK constellation are selected in a manner such that one point (the previous symbol point) is not selected.

According to the differential encoding based on an (M+1)-PSK constellation (in which one point is reserved), as illustrated in Equation 32, the correlation of symbols (see Equation 30) can be calculated as illustrated in Equation 33 below.

$$r_x(\tau) = E[X_n X_{n-\tau}^*] \quad \text{[Equation 33]}$$
$$= E[X_{n-1} f(b_n) X_{n-\tau}^*]$$
$$= E[X_{n-2} f(b_{n-1}) f(b_n) X_{n-\tau}^*]$$
$$= E[X_{n-3} f(b_{n-2}) f(b_{n-1}) f(b_n) X_{n-\tau}^*] = \ldots$$
$$= E[X_{n-\tau} f(b_{n-(\tau-1)}) \ldots f(b_{n-2}) f(b_{n-1}) f(b_n) X_{n-\tau}^*]$$
$$= E[f(b_{n-(\tau-1)}) \ldots f(b_{n-2}) f(b_{n-1}) f(b_n) X_{n-\tau} X_{n-\tau}^*]$$
$$= E[f(b_{n-(\tau-1)}) \ldots f(b_{n-2}) f(b_{n-1}) f(b_n)] E[X_{n-\tau} X_{n-\tau}^*]$$
$$= E[f(b_{n-(\tau-1)}) \ldots f(b_{n-2}) f(b_{n-1}) f(b_n)] E[|X_{n-\tau}|^2]$$
$$= \prod_{q=n-(\tau-1)}^{n} E[f(b_q)]$$

The term $E[f(b_q)]$ in Equation 33 above is demonstrated to be nonzero in Equation 34 below.

$$E[f(b_q)] = \frac{1}{M}\left(\sum_{k=0}^{M-1} e^{j\frac{2\pi}{M+1}(k+1)}\right) \quad \text{[Equation 34]}$$
$$= \frac{1}{M}\left(\sum_{k=0}^{M} e^{j\frac{2\pi}{M+1}k} - 1\right)$$
$$= -\frac{1}{M}$$

Due to the nonzero value of the average sum of constellation points, the correlation between symbols is nonzero (see Equation 35 below).

$$r_x(\tau) = E[X_n X_{n-\tau}^*] \quad \text{[Equation 35]}$$
$$= \prod_{q=n-(\tau-1)}^{n} E[f(b_q)]$$
$$= \prod_{q=n-(\tau-1)}^{n} \left(-\frac{1}{M}\right)$$
$$= \left(-\frac{1}{M}\right)^{\tau}$$

Applying Equation 35 to Equation 16, the ICI power is expressed according to Equation 36 below.

$$P_{ICI,m} = \sum_{\substack{n=1 \\ n \neq m}}^{N} E[|\hat{H}_{m,n}|^2] + \quad \text{[Equation 36]}$$

$$\sum_{\substack{n=1 \\ n \neq m}}^{N} \sum_{\substack{p=1 \\ p \neq m,n}}^{N} \left\{ \begin{array}{l} \left(-\frac{1}{M}\right)^{\tau} \times \frac{1}{N^2} \sum_{k=1}^{N} \sum_{k'=1}^{N} \\ \left[ r_h(k-k') \times e^{-j\frac{2\pi}{N}\{k \times (m-n) - k' \times (m-p)\}} \right] \\ \left[ \sum_{l=1}^{L} \sigma_l^2 \times e^{-j\frac{2\pi}{N}\{l \times (n-p)\}} \right] \end{array} \right\}$$

where $\tau = n - p$

With reference to Equation 36, the ICI power is reduced. Not all components of the correlation value of Equation 36 are negative in value. Rather, the components have alternating polarity, i.e., $$-\Delta \frac{1}{M}, \Delta \frac{1^2}{M^2}, -\Delta \frac{1^3}{M^3}, \Delta \frac{1^4}{M^4}, \ldots.$$

However, is will be appreciated that the ICI mainly results (or derives) from the first few terms of the above sequence and that the correlation value diminishes at the speed of square power. Therefore, the very first term, $r_x(\tau=1)$, plays a main role in determining the ICI power. According to the embodiment described with reference to Equation 32, the differential encoding reduces the ICI power.

The differential encoding of Equation 32 renders the correlation between symbols negative so as to reduce the ICI power, but it is based on a modified modulation constellation (e.g., see FIG. 13C) that is not generally used. For example, if the original modulation is based on BPSK (2-PSK), then the modified constellation will be based on 3-PSK. In a practical sense, this kind of modification from MPSK to (M+1)-PSK may introduce undesirable complexity at both the transmitter side and the receiver side. As such, it may be difficult to implement this approach, for example, in pre-existing components.

Various embodiments are directed to reducing ICI power while also retaining the original constellation points (i.e., the size of the original constellation). According to an exemplary embodiment, one of the points in the original constellation is punctured to render the constellation asymmetric. According to a particular embodiment, the point selected to be punctured is a point having a maximum real component—e.g., a point having a real component of 1 among points located on a unit circle of radius 1. The puncturing of the point renders the correlation of symbols negative so as to reduce ICI power. This puncturing can be viewed as being similar to a form of on-off keying (OOK), in which a point with a real component of 1 in the original constellation is replaced with a "turned-off" point (i.e., a point corresponding to the origin in the constellation plane). It is appreciated that, according to other embodiments, another point (having a real value less than the maximum real value) may be selected to be punctured, and/or the selected point may be moved to be closer to the origin. According to these other embodiments, the ICI power also will be reduced.

According to a particular embodiment, the differential encoding based on a punctured constellation is illustrated in Equation 37 below.

$$X_n = \frac{X_{n-1}}{|X_{n-1}|} f(b_n) \quad \text{[Equation 37]}$$

$$= \begin{cases} \frac{X_{n-1}}{|X_{n-1}|} e^{j\frac{2\pi}{M} b_n} & b_n \neq 0 \\ \frac{X_{n-1}}{|X_{n-1}|} \delta \times e^{j\pi} & b_n = 0, \delta \to 0+ \end{cases}$$

where
$b_n \in \{0, 1, 2, \ldots, M-1\}$ and $$f(b_n) = \begin{cases} 1 \times e^{j\frac{2\pi}{M} b_n} & b_n \neq 0 \\ \delta \times e^{j\pi} & b_n = 0, \delta \to 0+ \end{cases}$$

In Equation 37, the constellation function of a current symbol $b_n$, $f(b_n)$, is introduced to approach zero ($\delta \to 0+$) or an "off" value when $b_n=0$. More specifically, $b_n=0$ is mapped to a point ($\delta \times e^{j\pi}$) having a very small amplitude ($\delta \to 0+$) and 180-degree phase ($\pi$). In practice, the point to which $b_n=0$ is mapped may be viewed as a "transmit off" status (DTX-ed status) with inverse phase rotation. As such, according to the differential encoding illustrated in Equation 37, if the current symbol is the same as the previous symbol, transmission is effectively turned off. Implicitly, the phase is assumed to be inverse (i.e., changed by $\pi$). If the current symbol is not the same as the previous symbol, then the encoded symbol is determined based on differential encoding principles described earlier.

Figure 15C:
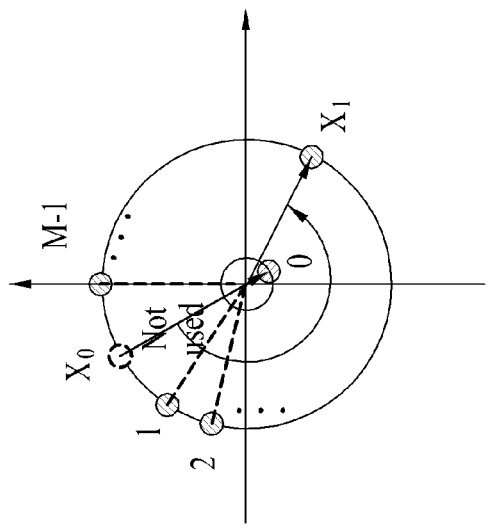
FIGS. 15A, 15B and 15C illustrate an application of differential encoding to an MPSK modulation scheme according to one embodiment.
Figure 15B:
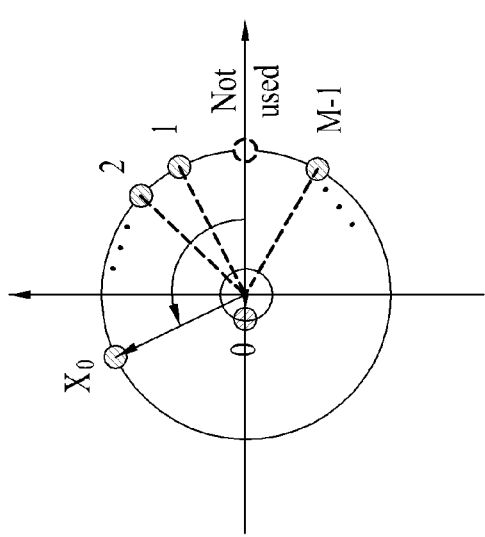
Figure 15A:
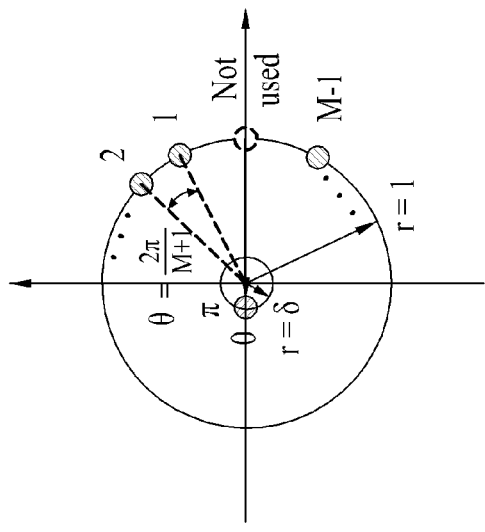

An application of differential encoding to a punctured constellation of will now be described with reference to FIGS. 15A, 15B and 15C. As illustrated in FIG. 15A, a point having a real component of 1 among points located on a unit circle of radius 1 is selected to be punctured (e.g., mapped to a point ($\delta \times e^{j\pi}$) having a very small amplitude ($\delta \to 0+$) and 180-degree phase ($\pi$)). As illustrated in FIG. 15B, the first symbol $X_0$ is offset from the x-axis by a certain offset. The position of this symbol will be used as a starting (or reference) point in the generation of the following symbol. As illustrated in FIG. 15C, the position of the following symbol $X_1$ is based on the phase offset of the previous symbol $X_0$. That is, the position of the previous symbol $X_0$ is used as a starting point in the generation of the following symbol $X_1$.

Based on the differential encoding illustrated in Equation 37, the correlation of symbols may be expressed according to Equation 38 below based on the expression $$\frac{f(b_q)}{|X_q|}.$$

$$r_x(\tau) = E[X_n X_{n-\tau}^*] \quad \text{[Equation 38]}$$

$$= E\left[\frac{X_{n-1}}{|X_{n-1}|} f(b_n) X_{n-\tau}^*\right]$$

$$= E\left[\frac{X_{n-2}}{|X_{n-2}|} f(b_{n-1}) \frac{1}{|X_{n-1}|} f(b_n) X_{n-\tau}^*\right]$$

$$= E\left[\frac{X_{n-3}}{|X_{n-3}|} f(b_{n-2}) \frac{1}{|X_{n-2}|} f(b_{n-1}) \frac{1}{|X_{n-1}|} f(b_n) X_{n-\tau}^*\right]$$

$$= E\left[\frac{X_{n-3}}{|X_{n-3}|} \frac{f(b_{n-2})}{|X_{n-2}|} \frac{f(b_{n-1})}{|X_{n-1}|} f(b_n) X_{n-\tau}^*\right] = \ldots$$

$$= E\left[\frac{X_{n-\tau}}{|X_{n-\tau}|} \frac{f(b_{n-(\tau-1)})}{|X_{n-(\tau-1)}|} \ldots \right.$$

-continued $$\left. \frac{f(b_{n-2})}{|X_{n-2}|} \frac{f(b_{n-1})}{|X_{n-1}|} f(b_n) X_{n-\tau}^* \right]$$

$$= E\left[\frac{|X_n|}{|X_{n-\tau}|} \frac{f(b_{n-(\tau-1)})}{|X_{n-(\tau-1)}|} \ldots \right.$$

$$\left. \frac{f(b_{n-2})}{|X_{n-2}|} \frac{f(b_{n-1})}{|X_{n-1}|} \frac{f(b_n)}{|X_n|} X_{n-\tau} X_{n-\tau}^* \right]$$

$$= E\left[\frac{|X_n|}{|X_{n-\tau}|} X_{n-\tau} X_{n-\tau}^*\right]$$

$$E\left[\frac{f(b_{n-(\tau-1)})}{|X_{n-(\tau-1)}|} \ldots \frac{f(b_{n-2})}{|X_{n-2}|} \frac{f(b_{n-1})}{|X_{n-1}|} \frac{f(b_n)}{|X_n|}\right]$$

$$= E\left[\frac{|X_n|}{|X_{n-\tau}|} |X_{n-\tau}|^2\right]$$

$$E\left[\frac{f(b_{n-(\tau-1)})}{|X_{n-(\tau-1)}|} \ldots \frac{f(b_{n-2})}{|X_{n-2}|} \frac{f(b_{n-1})}{|X_{n-1}|} \frac{f(b_n)}{|X_n|}\right]$$

$$= E[|X_n||X_{n-\tau}|] \prod_{q=n-(\tau-1)}^{n} E\left[\frac{f(b_q)}{|X_q|}\right]$$

The term $$E\left[\frac{f(b_q)}{|X_q|}\right]$$

in Equation 38 is determined to be nonzero according to Equation 39 below.

$$E\left[\frac{f(b_q)}{|X_q|}\right] = \frac{1}{M}\left(\sum_{k=1}^{M-1} e^{j\frac{2\pi}{M}k} + e^{j\pi}\right) \quad \text{[Equation 39]}$$

$$= \frac{1}{M}\left(\sum_{k=0}^{M} e^{j\frac{2\pi}{M}k} - 1\right) - \frac{1}{M}$$

$$= -\frac{2}{M}$$

In Equation 40 below, another term of Equation 38 ($E[|X_n||X_{n-\tau}|]$) is calculated.

$$E[|X_n||X_{n-\tau}|] = p(b_n \neq 0, b_{n-\tau} \neq 0) \times 1 \times 1 + \quad \text{[Equation 40]}$$

$$p(b_n = 0, b_{n-\tau} \neq 0) \times \delta \times 1 +$$

$$p(b_n \neq 0, b_{n-\tau} = 0) \times 1 \times \delta +$$

$$p(b_n = 0, b_{n-\tau} = 0) \times \delta \times \delta$$

$$= \left(1 - \frac{1}{M}\right)\left(1 - \frac{1}{M}\right) + \frac{1}{M}\left(1 - \frac{1}{M}\right)$$

$$\delta + \left(1 - \frac{1}{M}\right)\frac{1}{M}\delta + \frac{1}{M^2}\delta^2$$

$$= 1 - \frac{1}{M} - \frac{1}{M}\left(1 - \frac{1}{M}\right) + \frac{1}{M}\left(1 - \frac{1}{M}\right)$$

$$2\delta + \frac{\delta^2}{M^2}$$

$$= 1 - \frac{1}{M} + \frac{1}{M}\left(1 - \frac{1}{M}\right)(2\delta - 1) + \frac{\delta^2}{M^2}$$

Assuming that $\delta \to 0$, the limit of $E[|X_n||X_{n-\tau}|]$ can be calculated according to Equation 41 below.

$$\lim_{\delta\to 0} E[|X_n||X_{n-\tau}|] = \lim_{\delta\to 0}\left[\begin{array}{c}1-\frac{1}{M}+\frac{1}{M}\left(1-\frac{1}{M}\right)\\(2\delta-1)+\frac{\delta^2}{M^2}\end{array}\right]$$ [Equation 41]

$$=1-\frac{1}{M}-\frac{1}{M}+\frac{1}{M^2}$$

$$=1-\frac{2}{M}+\frac{1}{M^2}$$

$$=\left(1-\frac{1}{M}\right)^2$$

Due to the nonzero value of the average sum of the constellation points, the correlation between symbols has a nonzero value (see Equation 42 below).

$$r_x(\tau) = E[X_n X_{n-\tau}^*]$$ [Equation 42]

$$= E[|X_n||X_{n-\tau}|]\prod_{q=n-(\tau-1)}^{n} E\left[\frac{f(b_q)}{|X_q|}\right]$$

$$= \left[1-\frac{1}{M}+\frac{1}{M}\left(1-\frac{1}{M}\right)(2\delta-1)+\frac{\delta^2}{M^2}\right]\times$$

$$\prod_{q=n-(\tau-1)}^{n}\left(-\frac{2}{M}\right)$$

$$= \left[1-\frac{1}{M}+\frac{1}{M}\left(1-\frac{1}{M}\right)(2\delta-1)+\frac{\delta^2}{M^2}\right]\times$$

$$\left(-\frac{2}{M}\right)^\tau$$

$$= \Delta \times \left(-\frac{2}{M}\right)^\tau$$

$$\approx \left(1-\frac{1}{M}\right)^2\left(-\frac{2}{M}\right)^\tau$$

where $$\Delta \equiv \left[1-\frac{1}{M}+\frac{1}{M}\left(1-\frac{1}{M}\right)(2\delta-1)+\frac{\delta^2}{M^2}\right]$$

Applying Equation 42 to Equation 16, the ICI power is expressed according to Equation 43 below.

$$P_{ICI,m} = \sum_{\substack{n=1\\n\neq m}}^{N} E[|\hat{H}_{m,n}|^2] + \sum_{\substack{n=1\\n\neq m}}^{N}\sum_{\substack{p=1\\p\neq m,n}}^{N}$$ [Equation 43]

$$\left\{\begin{array}{c}\Delta\times\left(-\frac{2}{M}\right)^\tau\times\frac{1}{N^2}\sum_{k=1}^{N}\sum_{k'=1}^{N}\\ \left[r_h(k-k')\times e^{-j\frac{2\pi}{N}\{k\times(m-n)-k'\times(m-p)\}}\right]\\ \sum_{l=1}^{L}\sigma_l^2\times e^{-j\frac{2\pi}{N}\{l\times(n-p)\}}\end{array}\right\}$$

$$\approx \sum_{\substack{n=1\\n\neq m}}^{N} E[|\hat{H}_{m,n}|^2] + \sum_{\substack{n=1\\n\neq m}}^{N}\sum_{\substack{p=1\\p\neq m,n}}^{N}$$

$$\left\{\begin{array}{c}\left(1-\frac{1}{M}\right)^2\times\left(-\frac{2}{M}\right)^\tau\times\frac{1}{N^2}\sum_{k=1}^{N}\sum_{k'=1}^{N}\\ \left[r_h(k-k')\times e^{-j\frac{2\pi}{N}\{k\times(m-n)-k'\times(m-p)\}}\right]\\ \sum_{l=1}^{L}\sigma_l^2\times e^{-j\frac{2\pi}{N}\{l\times(n-p)\}}\end{array}\right\}$$

where $\tau = n - p$, $$\Delta = \left[1-\frac{1}{M}+\frac{1}{M}\left(1-\frac{1}{M}\right)(2\delta-1)+\frac{\delta^2}{M^2}\right]$$

Not all components of the correlation value of Equation 43 are negative in value. Rather, the components have alternating polarity, i.e., $$-\Delta\frac{2}{M}, \Delta\frac{2^2}{M^2}, -\Delta\frac{2^3}{M^3}, \Delta\frac{2^4}{M^4}, \ldots.$$

However, it will be appreciated that the ICI mainly results (or derives) from the first few terms and that the correlation value diminishes at the speed of square power. As such, the very first term, $r_x(\tau=1)$, plays a main role in determining ICI power. As such, according to the embodiment described with reference to Equation 37, the ICI power is reduced.

Figure 16A:
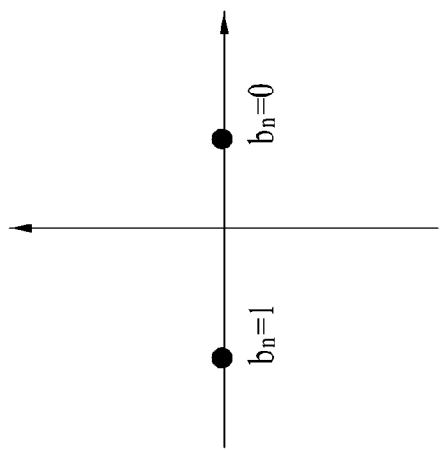
FIGS. 16A, 16B and 16C illustrate an application of differential encoding to a BPSK modulation scheme according to one embodiment.
Figure 16B:
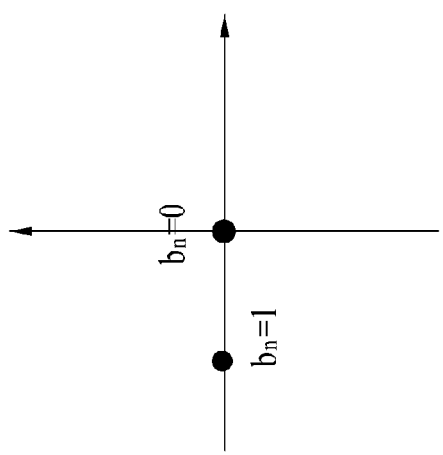
Figure 16C:
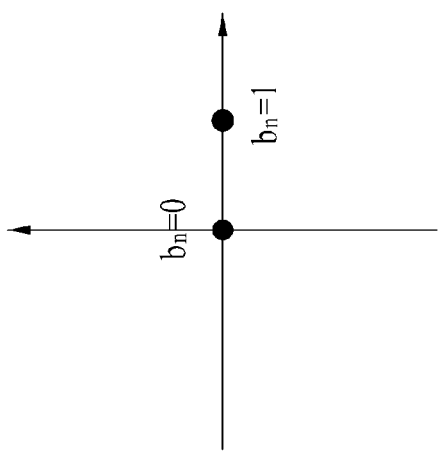

The differential encoding illustrated in Equation 37 can be applied to various conventional modulation schemes. For example, a conventional BPSK constellation is illustrated in FIG. 16A. As illustrated in the punctured constellation of FIG. 16B, one of the points in the constellation of FIG. 16A is selected to be punctured. As illustrated in FIG. 16C, the punctured constellation is then effectively rotated as differential encoding is performed.

Figure 17A:
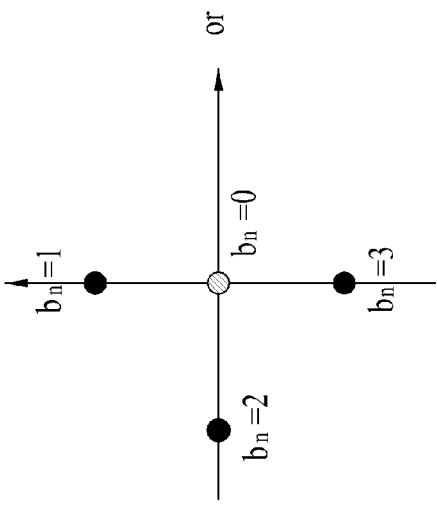
FIGS. 17A, 17B, 17C, 17D, 17E and 17F illustrate an application of differential encoding to a QPSK modulation scheme according to one embodiment.
Figure 17B:
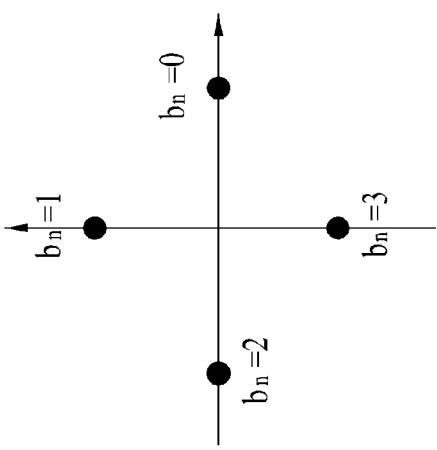
Figure 17C:
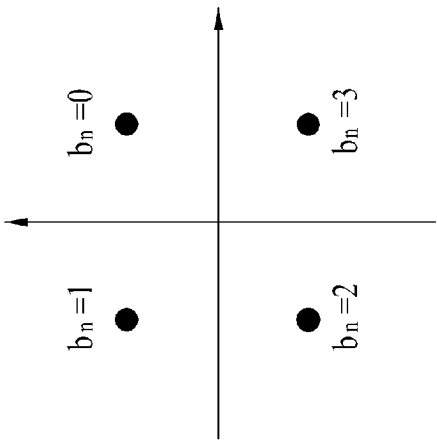
Figure 17D:
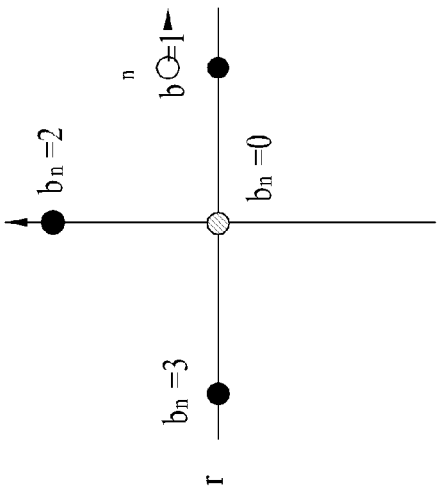
Figure 17E:
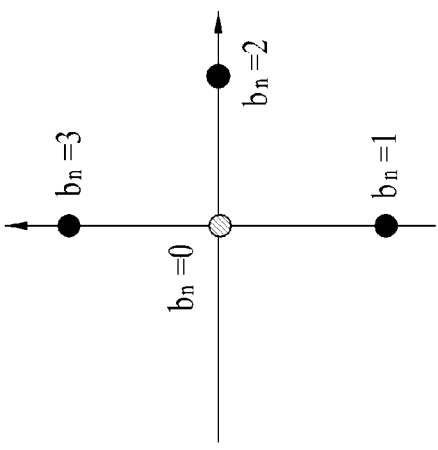
Figure 17F:
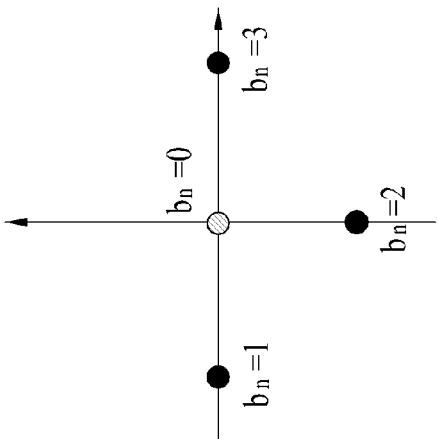

By way of further example, the differential encoding illustrated in Equation 37 can also be applied to a conventional QPSK constellation. A conventional QPSK constellation is illustrated in FIG. 17A. As illustrated in FIG. 17B, the constellation of FIG. 17A is rotated clockwise by 45 degrees. With reference to FIG. 17C, one of the points in the constellation of FIG. 17B is selected to be punctured. As illustrated in FIGS. 17D, 17E and 17F, the punctured constellation is then effectively rotated as differential encoding is performed.

For purposes of illustration, constellation points are rotated in the manner described above prior to puncturing. However, it is understood that the aspects and features described herein are also applicable to the points of a more general QPSK constellation.

Figure 18A:
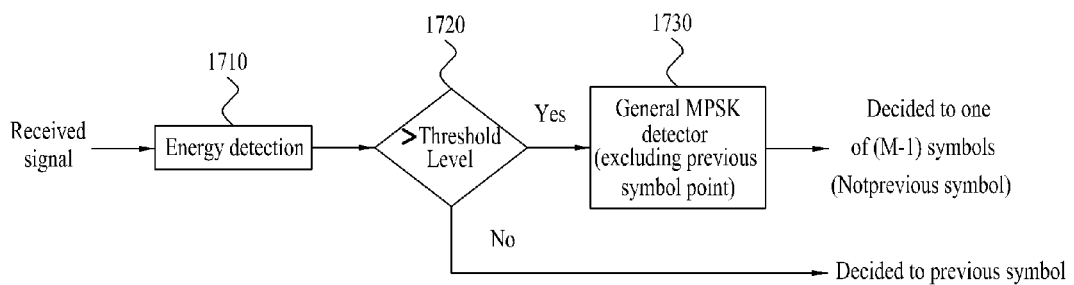
FIGS. 18A and 18B illustrate block diagrams of receivers according to respective embodiments.

With reference to various embodiments, a receiver receiving differentially encoded symbols as described above will be described below. With reference to FIG. 18A, a receiver will be described according to one embodiment. As illustrated in FIG. 18A, upon detecting a certain level of energy (box 1710), a receiver determines whether the detected level corresponds to a "transmit power on" situation or a "transmit power off" situation. The latter may correspond to the "turned-off" point that was described previously. For example, the receiver may compare the detected energy level to a certain threshold level (see box 1720). If the detected energy level is greater than the threshold level, then it is determined that the energy level corresponds to a symbol other than the previous symbol, and the received symbol is decoded (see box 1730). If the detected energy level is lower than the threshold level, then it is determined that the energy level corresponds to the "turned-off" point, and that, therefore, the current symbol is the same as the previous symbol. As such, the detected energy level is decoded as the previous symbol.

Figure 18B:
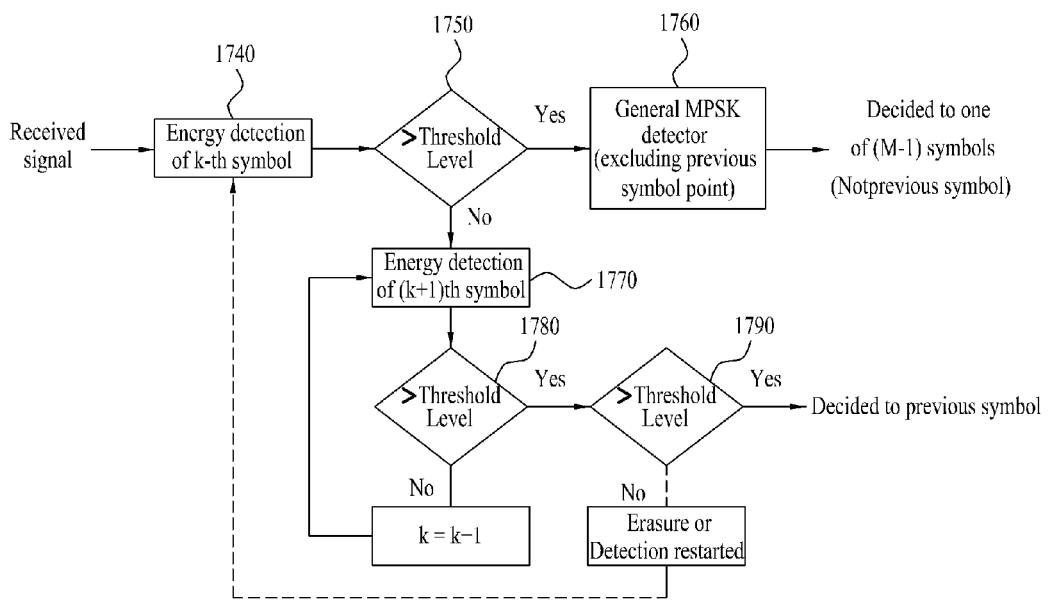

The receiver described above, which employs a form of on-off keying, may experience some degree of performance degradation compared to a conventional MPSK receiver. With reference to FIG. 18B, an alternative embodiment is directed to reducing such degradation. According to this alternative embodiment, on the transmission side, an amount of energy that is not spent (when a "turned-off" point is transmitted) is used in transmitting the following symbol. Accordingly, at the receiver side, if a detected energy level of a current symbol (see box 1740) is determined to be greater than a first threshold level (see box 1750), then it is determined that the energy level corresponds to a symbol other than the previous symbol, and the received symbol is decoded (see box 1760). However, if the detected energy level of the current symbol is determined to be less than the first threshold level, then the energy level of the next symbol is detected (see box 1770). This detected level may be compared against a series of two or more increasingly larger threshold levels to confirm whether or not the current symbol corresponds to a "turned-off" point.

For example, if the detected energy level of the following symbol is determined to be greater than a first threshold level (see box 1780), then it is determined whether the detected energy level of the following symbol is greater than a second, higher threshold level (see box 1790). If so, it is determined that the energy level of the current symbol corresponds to the "turned-off" point, and that, therefore, the current symbol is the same as the previous symbol.

If a series of symbols have the same value, then a series of symbols may be turned off such that the next turned-on symbol is transmitted at a corresponding higher power level. According to one embodiment, less than all of the energy that is not spent is used in transmitting the next turned-on symbol, to reduce the magnitude of differences in power between adjacent transmitted symbols. According to a particular embodiment, if more than two consecutive symbols are turned off, the energy corresponding to only one of the symbols is used in transmitting the next nonzero energy symbol.

Figure 19A:
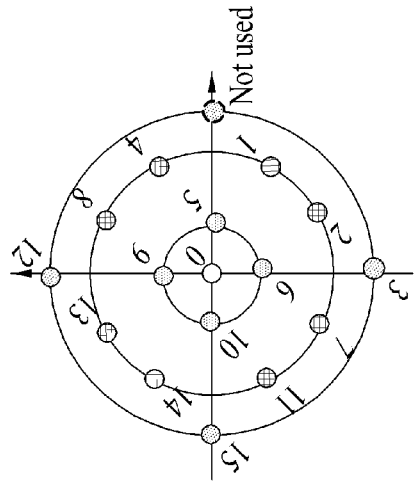
FIGS. 19A, 19B, 19C, 19D and 19E illustrate an application of differential encoding to a 16-QAM modulation scheme according to one embodiment.

Features and approaches described earlier may also be applied to modulation schemes other than MPSK to reduce ICI power. For example, certain embodiments are directed towards a 16-QAM constellation such as that illustrated in FIG. 18A. The points of the constellation of FIG. 19A may be viewed as an overlaying of three different MPSK constellations. As illustrated in FIG. 19A, the three constellations are based on circles of different diameters.

Figure 19B:
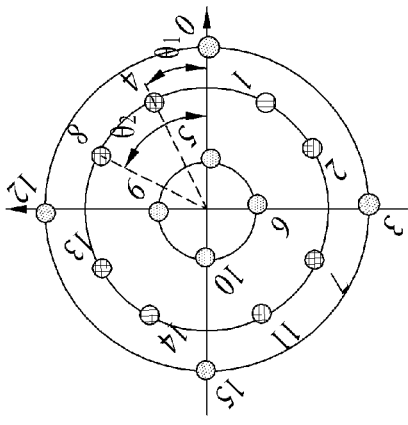

As illustrated in FIG. 19B, the 16-QAM constellation of FIG. 19A is rotated in a counter-clockwise direction by 135 degrees. In FIG. 19B, for purposes of illustration, constellation points are rotated in the manner described above. However, it is understood that the aspects and features described herein are also applicable to the points of a more general 16-QAM constellation.

Figure 19C:
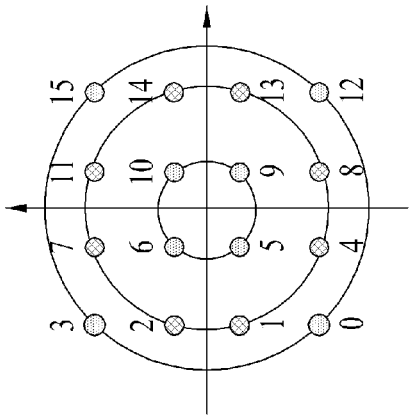
Figure 19D:
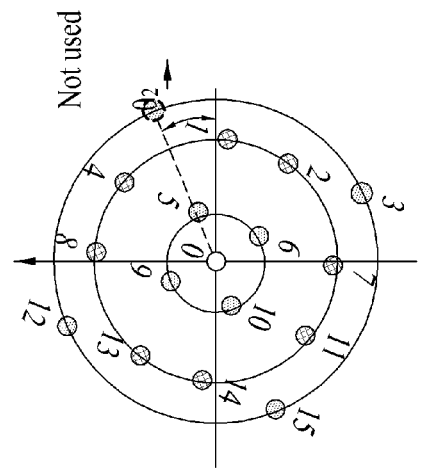
Figure 19E:
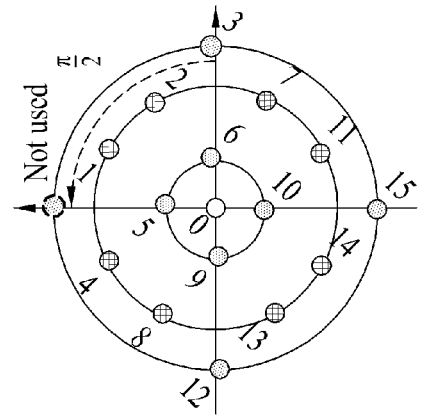

With reference to FIG. 19C, one of the points in the constellation of FIG. 19B is selected to be punctured. As illustrated in FIGS. 19D and 19E, the punctured constellation is then effectively rotated as differential encoding is performed.

Only several examples of constellation mappings are illustrated in FIGS. 19C, 19D and 19E. However, it is understood that there are 16 constellation mappings since a previous symbol could be any one of 16 symbols. Depending on the position of the previous symbol, the original constellation may not be kept as in FIG. 19E, that is because the constellation point may not be folded to give an exact same mirror image in two sides along the line rotated by specific phase of some constellation points, i.e. $\theta_1$ or $\theta_2$ in FIG. 19E. This may cause an unnecessary ambiguity in modulation constellations at the receiver, which may lead to added complexity and performance degradation.

In more detail, rotated QAM constellation points with respect to the one point in QAM constellation may result in different kinds of constellations (see, e.g., FIGS. 19D and 19E. In contrast, rotated PSK constellations (see, e.g., FIGS. 17A-E) keep the positions of constellation points intact; all the rotated constellation positions appear identical with different mapping rules. However, the rotated QAM constellations might have different positions of constellation points since the amount of rotation depends on the phase of the previous symbol, which might vary case by case. This is because the phase of a point in a QAM constellation cannot be represented as a multiple of base phase. In contrast, the phase of a point in a PSK constellation is a multiple of a minimum phase by definition.

As such, according to embodiments of the present invention, a star QAM configuration (see, e.g., FIG. 20B) is employed in lieu of a square QAM configuration (see, e.g., FIG. 20A). As based on a star QAM mapping, the differential encoding, as described herein, will not change the constellation points as in FIG. 19E, which reduces a burden on the receiver. FIG. 20B illustrates a 16 Star-QAM constellation, based on two circles (or "rings") having different diameters. FIGS. 20C and 20D respectively illustrate a 32 Star-QAM constellation and a 64 Star-QAM constellation, each of which is based on four circles (or "rings") having different diameters.

By way of example, FIGS. 21A, 21B, 21C and 21D illustrate an application of differential encoding to a constellation based on 16 Star-QAM. FIG. 21A illustrates a conventional 16 Star-QAM constellation. As illustrated in FIG. 21B, one of the points in the constellation of FIG. 21A is selected to be punctured. As illustrated in FIGS. 21C and 21D, the punctured constellation is then effectively rotated as differential encoding is performed.

Only several examples of constellation mappings are illustrated in FIGS. 21C and 21D. However, it is understood that there are 16 constellation mappings since a previous symbol could be any one of 16 symbols.

Figure 22A:
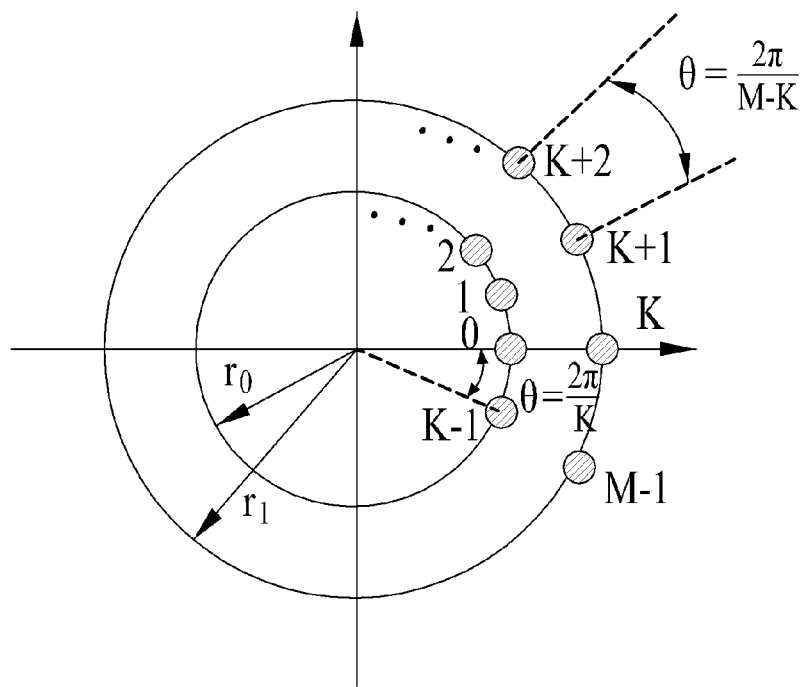
FIGS. 22A and 22B illustrate an application of differential encoding to a multi-circular MPSK modulation scheme according to one embodiment.

Regarding the application of the disclosed differential encoding to multi-circular MPSK schemes (see, e.g., FIG. 21A), an MPSK constellation based on circles having two different diameters will now be considered. With reference to FIG. 22A, the MPSK points are divided into two groups: K points in a first group are mapped to an inner circle (having radius $r_0$) based on general MPSK principles, and the remaining (M−K) points in a second group are mapped to an outer circle (having radius $r_1$) based on general MPSK principles. This mapping is also illustrated in Equation 44 below.

$$Z_n = \begin{cases} r_0 e^{j\frac{2\pi}{K}z_n} & \text{where } z_n \in ring_0 = \{0, 1, 2, \ldots, (K-1)\} \\ r_1 e^{j\frac{2\pi}{M-K}(z_n-K)} & \text{where } z_n \in ring_1 = \{K, K+1, \ldots, (M-1)\} \end{cases} \quad \text{[Equation 44]}$$

Figure 22B:
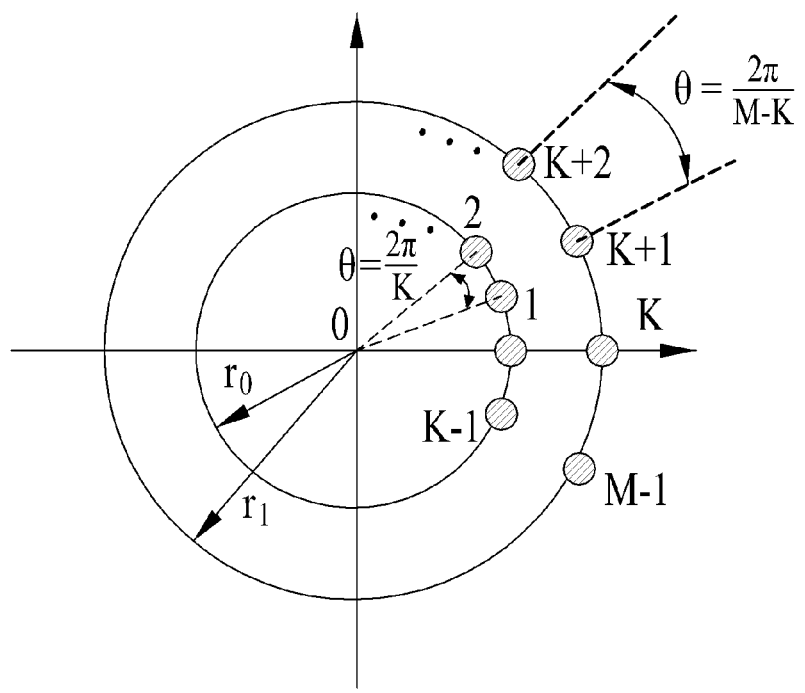

Based on a modified MPSK constellation as illustrated in FIG. 22B (in which one of the points on the inner circle is selected to be punctured), the differentially encoded transmitted symbol on m-th subcarrier based on Equation 37 can be defined according to Equation 45 below.

$$X_n = \frac{X_{n-1}}{|X_{n-1}|} f(b_n)$$

$$= \begin{cases} \delta \times e^{j\pi} & \text{where } b_n = 0, \delta \to 0 \\ r_0 e^{j\frac{2\pi}{K}b_n} & \text{where } b_n \in ring_0 = \{1, 2, \ldots, (K-1)\} \\ r_1 e^{j\frac{2\pi}{M-K}(b_n - K)} & \text{where } b_n \in ring_1 = \{K, K+1, \ldots, (M-1)\} \end{cases}$$

where $b_n \in \{0, 1, 2, \ldots, M-1\}$ and $$f(b_n) = \begin{cases} \delta \times e^{j\pi} & \text{where } b_n = 0, \delta \to 0 \\ r_0 e^{j\frac{2\pi}{K}b_n} & \text{where } b_n \in ring_0 = \{1, 2, \ldots, (K-1)\} \\ r_1 e^{j\frac{2\pi}{M-K}(b_n - K)} & \text{where } b_n \in ring_1 = \{K, K+1, \ldots, (M-1)\} \end{cases}$$

[Equation 45]

With reference to Equation 45, "ring 0" refers to the inner circle having radius $r_0$, and "ring 1" refers to the outer circle having radius $r_1$. Equation 45 is similar to Equation 37 except that the nonzero constellation points are categorized into two groups, each of which corresponds to a respective ring. Because the corresponding calculations based on Equation 45 follow previously presented calculations based on Equation 28, such calculations will not be repeated below. The resulting correlation of symbols is presented in Equation 46 below, which matches the results of Equation 38.

$$r_x(\tau) = E[X_n X_{n-\tau}^*]$$

$$= E[|X_n||X_{n-\tau}|] \prod_{q=n-(\tau-1)}^{n} E\left[\frac{f(b_q)}{|X_q|}\right]$$

[Equation 46]

The term $$E\left[\frac{f(b_q)}{|X_q|}\right]$$

of Equation 46 has a nonzero value as illustrated in Equation 47 below.

$$E\left[\frac{f(b_q)}{|X_q|}\right] = \frac{1}{M} e^{j\pi} + \frac{1}{K} \sum_{l=1}^{K-1} e^{j\frac{2\pi}{K}l} + \frac{1}{M-K} \sum_{l=0}^{M-K-1} e^{j\frac{2\pi}{K}l}$$

$$= -\frac{1}{M} + \frac{1}{K}\left(\sum_{l=0}^{K-1} e^{j\frac{2\pi}{K}l} - 1\right)$$

$$= -\left(\frac{1}{M} + \frac{1}{K}\right)$$

[Equation 47]

Another term of Equation 46 ($E[|X_n||X_{n-\tau}|]$) can be calculated as illustrated in Equation 48 below.

$$E[|X_n||X_{n-\tau}|] = p(b_n \in ring_0, b_{n-\tau} \in ring_0) \times r_0 \times r_0 +$$

$$p(b_n \in ring_1, b_{n-\tau} \in ring_0) \times r_1 \times r_0 +$$

$$p(b_n = 0, b_{n-\tau} \in ring_0) \times \delta \times r_0 +$$

$$p(b_n \in ring_0, b_{n-\tau} \in ring_1) \times r_0 \times r_1 +$$

[Equation 48]

-continued $$p(b_n \in ring_1, b_{n-\tau} \in ring_1) \times r_1 \times r_1 +$$

$$p(b_n = 0, b_{n-\tau} \in ring_1) \times \delta \times r_1 +$$

$$p(b_n \in ring_0, b_{n-\tau} = 0) \times r_0 \times \delta +$$

$$p(b_n \in ring_1, b_{n-\tau} = 0) \times r_1 \times \delta +$$

$$p(b_n = 0, b_{n-\tau} = 0) \times \delta \times \delta =$$

$$\frac{K-1}{M}\frac{K-1}{M}r_0^2 + \frac{M-K}{M}\frac{K-1}{M}r_0 r_1 + \frac{1}{M}\frac{K-1}{M}\delta r_0 +$$

$$\frac{K-1}{M}\frac{M-K}{M}r_0 r_1 + \frac{M-K}{M}\frac{M-K}{M}r_1^2 +$$

$$\frac{1}{M}\frac{M-K}{M}\delta r_1 + \frac{K-1}{M}\frac{1}{M}\delta r_0 + \frac{M-K}{M}\frac{1}{M}\delta r_1 +$$

$$\frac{1}{M^2}\delta^2 = \frac{(K-1)^2}{M^2}r_0^2 + \frac{(K-1)(M-K)}{M^2}r_0 r_1 +$$

$$\frac{K-1}{M^2}\delta r_0 + \frac{(K-1)(M-K)}{M^2}r_0 r_1 + \frac{(M-K)^2}{M^2}r_1^2 +$$

$$\frac{M-K}{M^2}\delta r_1 + \frac{K-1}{M^2}\delta r_0 + \frac{M-K}{M^2}\delta r_1 + \frac{1}{M^2}\delta^2 =$$

$$\frac{1}{M^2}\begin{Bmatrix} (K-1)^2 r_0^2 + 2(K-1)(M-K)r_0 r_1 + \\ (M-K)^2 r_1^2 + 2(K-1)\delta r_0 + \\ 2(M-K)\delta r_1 + \delta^2 \end{Bmatrix} =$$

$$\frac{1}{M^2}\begin{Bmatrix} [(K-1)r_0 + (M-K)r_1]^2 + \\ 2(K-1)\delta r_0 + 2(M-K)\delta r_1 + \delta^2 \end{Bmatrix}$$

Assuming that $\delta \to 0$, the limit of $E[|X_n||X_{n-\tau}|]$ can be calculated as illustrated in Equation 49 below.

$$\lim_{\delta \to 0} E[|X_n||X_{n-\tau}|] = \lim_{\delta \to 0} \frac{1}{M^2}\begin{Bmatrix} [(K-1)r_0 + (M-K)r_1]^2 + \\ 2(K-1)\delta r_0 + 2(M-K) \\ \delta r_1 + \delta^2 \end{Bmatrix}$$

$$= \frac{[(K-1)r_0 + (M-K)r_1]^2}{M^2}$$

$$= \left(\frac{(K-1)r_0 + (M-K)r_1}{M}\right)^2$$

$$= \left(\frac{(K-1)}{M}r_0 + \frac{(M-K)}{M}r_1\right)^2$$

[Equation 49]

Due to the nonzero value of the average sum of constellation points, the correlation between symbols has a nonzero value (see Equation 50 below).

$$r_x(\tau) = E[X_n X_{n-\tau}^*] \quad \text{[Equation 50]}$$

$$= E[|X_n||X_{n-\tau}|] \prod_{q=n-(\tau-1)}^{n} E\left[\frac{f(b_q)}{|X_q|}\right]$$

$$= \frac{1}{M^2} \left\{ \begin{array}{l} [(K-1)r_0 + (M-K)r_1]^2 + \\ 2(K-1)\delta r_0 + \\ 2(M-K)\delta r_1 + \delta^2 \end{array} \right\} \times$$

$$\prod_{q=n-(\tau-1)}^{n} \left[-\left(\frac{1}{M} + \frac{1}{K}\right)\right]$$

$$= \frac{1}{M^2} \left\{ \begin{array}{l} [(K-1)r_0 + (M-K)r_1]^2 + \\ 2(K-1)\delta r_0 + 2(M-K)\delta r_1 + \delta^2 \end{array} \right\} \times$$

$$\left[-\left(\frac{1}{M} + \frac{1}{K}\right)\right]^\tau$$

$$= \Delta' \times \left[-\left(\frac{1}{M} + \frac{1}{K}\right)\right]^\tau$$

$$\approx \left(\frac{(K-1)}{M}r_0 + \frac{(M-K)}{M}r_1\right)^2 \left[-\left(\frac{1}{M} + \frac{1}{K}\right)\right]^\tau$$

where $$\Delta' \equiv \frac{1}{M^2} \left\{ \begin{array}{l} [(K-1)r_0 + (M-K)r_1]^2 + \\ 2(K-1)\delta r_0 + 2(M-K)\delta r_1 + \delta^2 \end{array} \right\}$$

Applying Equation 50 to Equation 16, the ICI power will be reduced as illustrated in Equation 51.

$$P_{ICI,m} = \sum_{\substack{n=1 \\ n \neq m}}^{N} E[|\hat{H}_{m,n}|^2] + \quad \text{[Equation 51]}$$

$$\sum_{\substack{n=1 \\ n \neq m}}^{N} \sum_{\substack{p=1 \\ p \neq m,n}}^{N} \left\{ \begin{array}{l} \Delta\left[-\left(\frac{1}{M} + \frac{1}{K}\right)\right]^\tau \times \frac{1}{N^2} \\ \sum_{k=1}^{N} \sum_{k'=1}^{N} \left[ \begin{array}{c} r_h(k-k') \times \\ e^{-j\frac{2\pi}{N}\{k \times (m-n) - k' \times (m-p)\}} \\ \sum_{l=1}^{L} \sigma_l^2 \times e^{-j\frac{2\pi}{N}\{l \times (n-p)\}} \end{array} \right] \end{array} \right\} \approx$$

$$\sum_{\substack{n=1 \\ n \neq m}}^{N} E[|\hat{H}_{m,n}|^2] +$$

$$\sum_{\substack{n=1 \\ n \neq m}}^{N} \sum_{\substack{p=1 \\ p \neq m,n}}^{N} \left\{ \begin{array}{l} \left(\frac{(K-1)}{M}r_0 + \frac{(M-K)}{M}r_1\right)^2 \times \\ \left[-\left(\frac{1}{M} + \frac{1}{K}\right)\right]^\tau \times \frac{1}{N^2} \sum_{k=1}^{N} \sum_{k'=1}^{N} \\ \left[ \begin{array}{c} r_h(k-k') \times e^{-j\frac{2\pi}{N}\{k \times (m-n) - k' \times (m-p)\}} \\ \sum_{l=1}^{L} \sigma_l^2 \times e^{-j\frac{2\pi}{N}\{l \times (n-p)\}} \end{array} \right] \end{array} \right\}$$

where $$\tau = n - p,$$

$$\Delta' \equiv \frac{1}{M^2}\{[(k-1)r_0 + (M-K)r_1]^2 +$$

$$2(K-1)\delta r_0 + 2(M-K)\delta r_1 + \delta^2\}$$

Not all components of the correlation value of Equation 51 are negative in value. Rather, the components have alternating polarity, i.e., $$-\Delta\frac{1}{M}, \Delta\frac{1^2}{M^2}, -\Delta\frac{1^3}{M^3}, \Delta\frac{1^4}{M^4}, \ldots.$$

However, it will be appreciated that the ICI mainly results (or derives) from the first few terms and that the correlation value diminishes at the speed of square power. As such, the very first term, $r_x(\tau=1)$, plays a main role in determining the ICI power. According to the embodiment described with reference to Equation 51, the differential encoding reduces the ICI power.

The foregoing embodiments and advantages are merely exemplary and are not to be construed as limiting the present invention. The present teaching can be readily applied to other types of apparatuses and processes. The description of embodiments of the present invention is intended to be illustrative, and not to limit the scope of the claims. Many alternatives, modifications, and variations will be apparent to those skilled in the art.

What is claimed is:

1. A method of transmitting signals in a wireless access system, the method comprising:
   modulating data into symbols using a second constellation; and
   transmitting OFDM (orthogonal frequency division multiplexed) signals generated based on the symbols,
   wherein a first constellation includes a plurality of points symmetric with respect to the first axis and the second axis, and
   wherein the second constellation is defined by rotating the first constellation such that a first point of the rotated first constellation is positioned on the first axis and shifting a position of the first point toward the origin.

2. The method of claim 1, further comprising:
   rotating the second constellation by an angle of a signal on a preceding adjacent subcarrier of a subcarrier carrying the plurality of OFDM signals.

3. The method of claim 1, further comprising:
   rotating the second constellation by a sum of an angle of a signal on a preceding adjacent subcarrier of a subcarrier carrying the plurality of OFDM signals and an angle of 180 degrees when the signal on the preceding adjacent subcarrier corresponds to the first point.

4. The method of claim 1, wherein the second constellation is asymmetric with respect to at least the first axis or the second axis.

5. The method of claim 1, wherein the first axis corresponds to a real-domain axis and the second axis corresponds to an imaginary-domain axis.

6. The method of claim 5, wherein the second constellation is defined by shifting the position of the first point such that the first point is located at the origin and corresponds to a transmission-off state.

7. The method of claim 1,
   wherein the first axis corresponds to a real-domain axis and the second axis corresponds to an imaginary-domain axis,
   wherein the second constellation is defined by selecting a first point of the first constellation based on a magnitude of a projection of the first point along the real-domain axis and shifting the position of the first point such that the first point is located at the origin.

8. The method of claim 7, wherein the magnitude of the projection of the first point along the real-domain axis is greater than zero.

9. The method of claim 8, wherein the magnitude of the projection of the first point along the real-domain axis is larger than a magnitude of a projection of at least a second point of the first constellation along the real-domain axis.

10. The method of claim 8, wherein the magnitude of the projection of the first point along the real-domain axis is largest among respective magnitudes of projections of the first constellation along the real-domain axis.

11. The method of claim 1, wherein a modulation scheme of the first constellation comprises a 2-PSK, 4-PSK modulation scheme, an 8-PSK modulation scheme, a 16-PSK modulation scheme, or a 32-PSK modulation scheme.

12. The method of claim 1, wherein a modulation scheme of the first constellation comprises a 2-QAM constellation, a 4-QAM constellation scheme, a 16-QAM constellation scheme, a 32-QAM constellation scheme or a 64-QAM constellation scheme.

13. An apparatus for transmitting signals in a wireless access system, the apparatus comprising:
- a RF (radio frequency) unit; and
- a processor configured to:
  - modulate data into symbols using a second constellation; and
  - transmit OFDM (orthogonal frequency division multiplexed) signals generated based on the symbols,
  - wherein a first constellation includes a plurality of points symmetric with respect to the first axis and the second axis, and
  - wherein the second constellation is defined by rotating the first constellation such that a first point of the rotated first constellation is positioned on the first axis and shifting a position of the first point toward the origin.

* * * * *